US012482841B2

(12) United States Patent
Vaish et al.

(10) Patent No.: US 12,482,841 B2
(45) Date of Patent: Nov. 25, 2025

(54) RANGE ESTIMATOR AND LIFE-BASED POWER DEMAND STRATEGY FOR FUEL CELL POWERTRAIN SYSTEMS AND METHODS

(71) Applicant: CUMMINS INC., Columbus, IN (US)

(72) Inventors: Prateek Vaish, West Sacramento, CA (US); Patrick Kaufman, Vacaville, CA (US); Jifei Yan, West Sacramento, CA (US); Roger William Gomes, Elk Grove, CA (US); Venkat Sri Sai Guturi, Redmond, WA (US); Yash Agarwal, San Jose, CA (US); Vishavjit Singh, Sacramento, CA (US)

(73) Assignee: CUMMINS INC., Columbus, IN (US)

( * ) Notice: Subject to any disclaimer, the term of this patent is extended or adjusted under 35 U.S.C. 154(b) by 0 days.

(21) Appl. No.: 18/946,207

(22) Filed: Nov. 13, 2024

(65) Prior Publication Data
US 2025/0192212 A1      Jun. 12, 2025

Related U.S. Application Data

(60) Provisional application No. 63/607,445, filed on Dec. 7, 2023.

(51) Int. Cl.
*H01M 8/04858* (2016.01)
*G01R 31/387* (2019.01)
(Continued)

(52) U.S. Cl.
CPC ...... *H01M 8/04932* (2013.01); *G01R 31/387* (2019.01); *G01R 31/392* (2019.01);
(Continued)

(58) Field of Classification Search
CPC ......... H01M 8/04932; H01M 8/04626; H01M 8/04947; H01M 16/006; H01M 2220/20;
(Continued)

(56) References Cited

U.S. PATENT DOCUMENTS 8,406,948 B2    3/2013   Wang et al.
8,930,125 B2    1/2015   Fasse et al.
(Continued)

FOREIGN PATENT DOCUMENTS

CN        115339330 A  * 11/2022  .............. B60L 50/40
WO     WO2021139936       7/2021

OTHER PUBLICATIONS

CN115339330A. Nov. 15, 2022. English machine translation by EPO. (Year: 2022).*

*Primary Examiner* — James Lee
(74) *Attorney, Agent, or Firm* — Barnes & Thornburg LLP

(57) ABSTRACT

A method of operating a fuel cell includes determining a total age of the fuel cell, determining a state-of-charge of a battery, in response to the state-of-charge of the battery being greater than a predetermined charge threshold, operating the fuel cell at a maximum efficiency point. The method further includes in response to the state-of-charge of the battery being less than or equal to the predetermined charge threshold, operating the fuel cell such that the battery operates in a charge-sustaining mode. The maximum efficiency point is based on the determined total age of the fuel cell, and the maximum efficiency power output of the fuel cell at the maximum efficiency point increases as the total age of the fuel cell increases so as to maximize a range of the fuel cell.

20 Claims, 10 Drawing Sheets

(51) Int. Cl.
  *G01R 31/392* (2019.01)
  *H01M 8/04537* (2016.01)
  *H01M 16/00* (2006.01)

(52) U.S. Cl.
  CPC ... *H01M 8/04626* (2013.01); *H01M 8/04947* (2013.01); *H01M 16/006* (2013.01); *H01M 2220/20* (2013.01); *H01M 2250/20* (2013.01)

(58) Field of Classification Search
  CPC .................. H01M 2250/20; G01R 31/387; G01R 31/392
  See application file for complete search history.

(56) References Cited

U.S. PATENT DOCUMENTS

| | | | |
|---|---|---|---|
| 9,543,602 B2 | 1/2017 | Mai et al. | |
| 10,522,859 B2 | 12/2019 | Arisetty et al. | |
| 11,862,829 B2 | 1/2024 | Braun et al. | |
| 2011/0064976 A1* | 3/2011 | Shimoda | H01M 10/44 429/431 |
| 2022/0255100 A1 | 8/2022 | Vallur Rajendran et al. | |

* cited by examiner

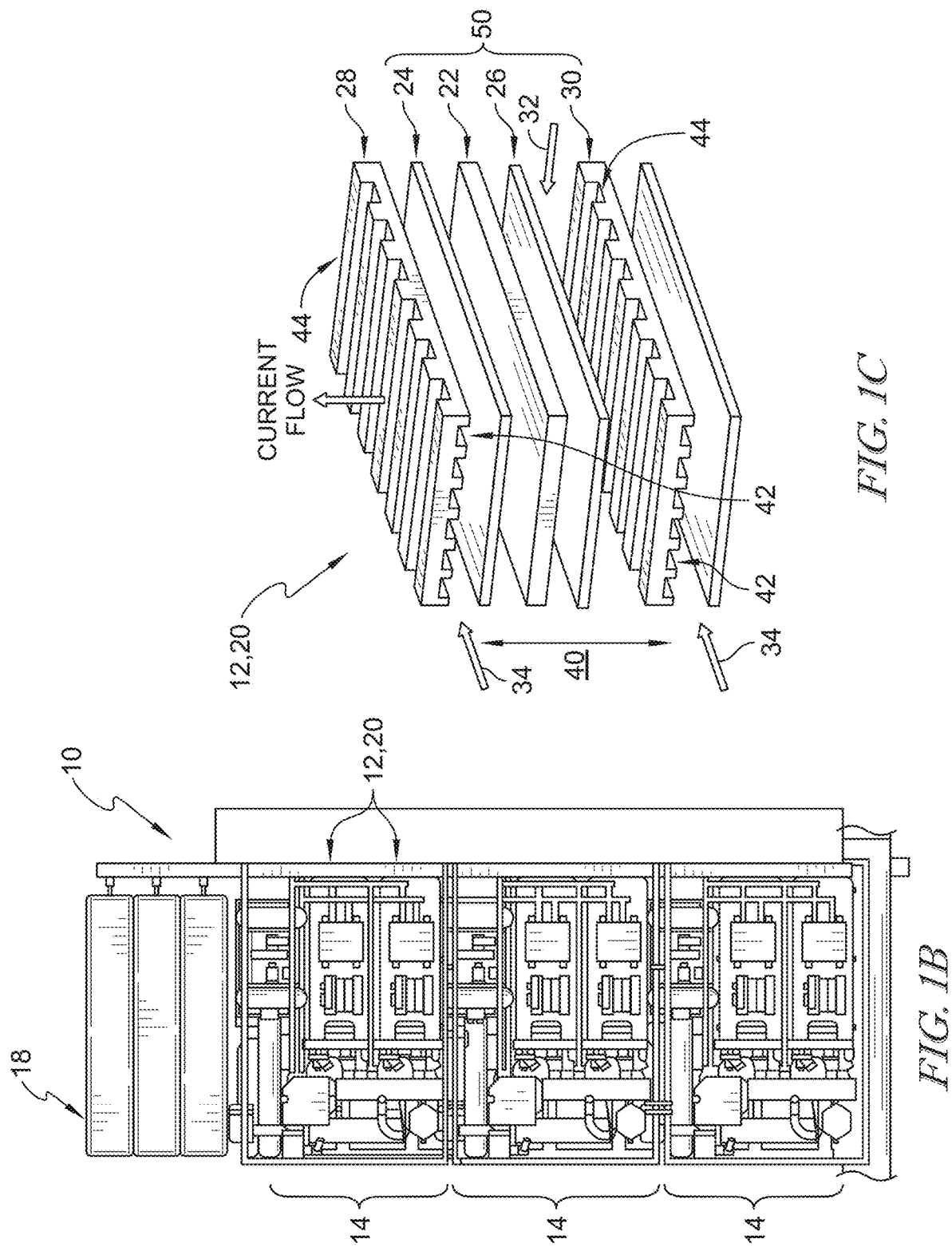

RANGE ESTIMATOR AND LIFE-BASED POWER DEMAND STRATEGY FOR FUEL CELL POWERTRAIN SYSTEMS AND METHODS

CROSS-REFERENCE TO RELATED APPLICATIONS

This nonprovisional application claims the benefit and priority, under 35 U.S.C. § 119 (e) and any other applicable laws or statues, to U.S. Provisional Patent Application Ser. No. 63/607,445 filed on Dec. 7, 2023, the entire disclosure of which is hereby expressly incorporated herein by reference.

GOVERNMENT LICENSE RIGHTS

This invention was made with State of California support under California Energy Commission grant number EPC-17-020. The California Energy Commission has certain rights to this invention.

TECHNICAL FIELD

The present disclosure generally relates to fuel cell assemblies, and in particular, power regulation strategies for operating fuel cell assemblies.

BACKGROUND

A single fuel cell is one of many repeating units of a fuel cell stack that may provide power or energy for personal and/or industrial use. The typical proton exchange membrane (PEM) fuel cell is comprised of many fuel cell assemblies compressed and bound into a fuel cell stack. A PEM fuel cell is a multi-component assembly that often comprises a membrane electrode assembly (MEA) at the center, a gas diffusion layer (GDL) on either side of the membrane electrode assembly (MEA), and a bipolar plate (BPP) on either side of the gas diffusion layer (GDL). The membrane electrode assembly (MEA) is the component that enables electrochemical reactions in the fuel cell and/or fuel cell stack. Typically, a PEM fuel cell and/or fuel cell stack is assembled with the aforementioned components to operate in a useful and reliable manner.

One of the many applications of fuel cells includes powering transportation electric vehicles. One of the greatest challenges with fuel cell electric vehicles is packages of hydrogen fuel supply tanks on the vehicles. As such, limited hydrogen fuel limits the range of the fuel cell electric vehicle. Accordingly, it is imperative to optimize the operation of the fuel cell(s) within the fuel cell electric vehicle to maximize the range of the vehicle.

A common approach to maximizing the range of fuel cell electric vehicles is to increase the powertrain size by increasing fuel cell size and power along with larger high-voltage lithium-ion batteries and larger hydrogen fuel tanks. This approach, however, is costly and increases the weight and complexity of the vehicle. Another approach includes implementing power scheduling strategies of the fuel cell(s) in an attempt to increase the life of the fuel cell itself as the fuel cell ages. This approach, however, does not maximize the range of the fuel cell electric vehicle.

Accordingly, it would be advantageous to provide a system for optimally operating a fuel cell or fuel cells of an electric vehicle in order to maximize range of the electric vehicle while taking into account the age of the fuel cell(s).

Moreover, it would be advantageous to provide a method for determining the range of the electric vehicle based on the age of the fuel cell(s).

SUMMARY

According to a first aspect of the present disclosure, a method of operating a fuel cell includes, determining, via a controller including a processor, a total age of the fuel cell, the total age defined by a total time period that the fuel cell has been operating over a lifespan of the fuel cell, determining, via the controller, a state-of-charge of a battery associated with the fuel cell, and in response to the state-of-charge of the battery being greater than a predetermined charge threshold, operating the fuel cell at a maximum efficiency point. The maximum efficiency point is predetermined via the controller and is based on predetermined efficiency data of the fuel cell and the maximum efficiency point corresponds to a maximum efficiency power output of the fuel cell.

The method can further include, in response to the state-of-charge of the battery being less than or equal to the predetermined charge threshold, operating the fuel cell such that the battery operates in a charge-sustaining mode. The maximum efficiency point is based on the determined total age of the fuel cell, and the maximum efficiency power output of the fuel cell at the maximum efficiency point increases as the total age of the fuel cell increases so as to maximize a range of the fuel cell.

In some embodiments, the total age of the fuel cell includes a first predetermined age threshold, the fuel cell is operated at a first maximum efficiency point in response to the total age of the fuel cell being below the first predetermined age threshold, and the fuel cell is operated at a second maximum efficiency point different than the first maximum efficiency point in response to the total age of the fuel cell being at or above the first predetermined age threshold. In some embodiments, the first maximum efficiency point corresponds to a first power output of the fuel cell and the second maximum efficiency point corresponds to a second power output of the fuel cell greater than the first power output.

In some embodiments, the total age of the fuel cell further includes a second predetermined age threshold greater than the first predetermined age threshold, the fuel cell is operated at the second maximum efficiency point in response to the total age of the fuel cell being at or above the first predetermined age threshold and below the second predetermined age threshold, and the fuel cell is operated at a third maximum efficiency point different than the first and second maximum efficiency points in response to the total age of the fuel cell being at or above the second predetermined age threshold.

In some embodiments, the third maximum efficiency point corresponds to a third power output of the fuel cell greater than the first and second power outputs. In some embodiments, a time period that is less than the first predetermined age threshold is a beginning-of-life age of the fuel cell, a time period that is at or above the first predetermined age threshold and below the second predetermined age threshold is a mid-life age of the fuel cell, and a time period that is at or above the second predetermined age threshold is an end-of-life time age of the fuel cell.

In some embodiments, during the operation of the fuel cell in a first duty cycle environment, the operating of the fuel cell such that the battery operates in a charge-sustaining mode corresponds to a charge-sustaining power output of the fuel cell that is greater than the maximum efficiency power output of the fuel cell. In some embodiments, during the operation of the fuel cell in the first duty cycle environment, the state-of-charge of the battery is at or below the predetermined charge threshold for a first period of time and is above the predetermined charge threshold for a second period of time different than the first period of time, and, during the first period of time, operating the fuel cell at the charge-sustaining power output and, during the second time period, operating the fuel cell at the maximum efficiency power output.

In some embodiments, the total age of the fuel cell includes a first predetermined age threshold. During the first period of time, the fuel cell is operated at a first charge-sustaining power output in response to the total age of the fuel cell being below the first predetermined age threshold, and, during the first period of time, the fuel cell is operated at a second charge-sustaining power output less than the first charge-sustaining power output in response to the total age of the fuel cell being at or above the first predetermined age threshold.

In some embodiments, during the second period of time, the fuel cell is operated at a first maximum efficiency power output in response to the total age of the fuel cell being below the first predetermined age threshold, and, during the first period of time, the fuel cell is operated at a second maximum efficiency power output greater than the first maximum efficiency power output in response to the total age of the fuel cell being at or above the first predetermined age threshold.

According to a second aspect of the present disclosure, a method includes determining, via a controller including a processor, a total age of the fuel cell, determining, via the controller, a state-of-charge of a battery associated with the fuel cell, in response to the state-of-charge of the battery being greater than a predetermined charge threshold, operating the fuel cell at a maximum efficiency point, and in response to the state-of-charge of the battery being less than or equal to the predetermined charge threshold, operating the fuel cell such that the battery operates in a charge-sustaining mode. The maximum efficiency point is based on the determined total age of the fuel cell and varies relative to the total age of the fuel cell so as to maximize a range of the fuel cell.

In some embodiments, the total age defined by a total time period that the fuel cell has been operating over a lifespan of the fuel cell, the maximum efficiency point is predetermined via the controller and is based on predetermined efficiency data of the fuel cell, and the maximum efficiency point corresponds to a maximum efficiency power output of the fuel cell. In some embodiments, the maximum efficiency power output of the fuel cell at the maximum efficiency point increases as the total age of the fuel cell increases so as to maximize a range of the fuel cell.

In some embodiments, the total age of the fuel cell includes a first predetermined age threshold, the fuel cell is operated at a first maximum efficiency point in response to the total age of the fuel cell being below the first predetermined age threshold, and the fuel cell is operated at a second maximum efficiency point different than the first maximum efficiency point in response to the total age of the fuel cell being at or above the first predetermined age threshold. In some embodiments, the first maximum efficiency point corresponds to a first power output of the fuel cell and the second maximum efficiency point corresponds to a second power output of the fuel cell greater than the first power output.

In some embodiments, the total age of the fuel cell further includes a second predetermined age threshold greater than the first predetermined age threshold, the fuel cell is operated at the second maximum efficiency point in response to the total age of the fuel cell being at or above the first predetermined age threshold and below the second predetermined age threshold, and the fuel cell is operated at a third maximum efficiency point different than the first and second maximum efficiency points in response to the total age of the fuel cell being at or above the second predetermined age threshold.

According to a third aspect of the present disclosure, a system for operating a fuel cell includes a controller including a processor, a fuel cell operably connected to the controller, and a battery associated with the fuel cell and operably connected to the controller. The controller is configured to determine a total age of the fuel cell, the total age defined by a total time period that the fuel cell has been operating over a lifespan of the fuel cell, determine a state-of-charge of a battery associated with the fuel cell, in response to the state-of-charge of the battery being greater than a predetermined charge threshold, operate the fuel cell at a maximum efficiency point, wherein the maximum efficiency point is predetermined via the controller and is based on predetermined efficiency data of the fuel cell, wherein the maximum efficiency point corresponds to a maximum efficiency power output of the fuel cell, and, in response to the state-of-charge of the battery being less than or equal to the predetermined charge threshold, operate the fuel cell such that the battery operates in a charge-sustaining mode. The maximum efficiency point is based on the determined total age of the fuel cell, and the maximum efficiency power output of the fuel cell at the maximum efficiency point increases as the total age of the fuel cell increases so as to maximize a range of the fuel cell.

In some embodiments, the total age of the fuel cell includes a first predetermined age threshold, the fuel cell is operated at a first maximum efficiency point in response to the total age of the fuel cell being below the first predetermined age threshold, and the fuel cell is operated at a second maximum efficiency point different than the first maximum efficiency point in response to the total age of the fuel cell being at or above the first predetermined age threshold. In some embodiments, the first maximum efficiency point corresponds to a first power output of the fuel cell and the second maximum efficiency point corresponds to a second power output of the fuel cell greater than the first power output.

In some embodiments, the total age of the fuel cell further includes a second predetermined age threshold greater than the first predetermined age threshold, the fuel cell is operated at the second maximum efficiency point in response to the total age of the fuel cell being at or above the first predetermined age threshold and below the second predetermined age threshold, and the fuel cell is operated at a third maximum efficiency point different than the first and second maximum efficiency points in response to the total age of the fuel cell being at or above the second predetermined age threshold.

BRIEF DESCRIPTION OF DRAWINGS

This disclosure will be more fully understood from the following detailed description taken in conjunction with the accompanying drawings, in which:

FIG. 1B is a cutaway view of an exemplary fuel cell system including an air delivery system, hydrogen delivery systems, and a plurality of fuel cell modules each including multiple fuel cell stacks;

FIG. 1C is a perspective view of an exemplary repeating unit of a fuel cell stack of the fuel cell system of FIG. 1A;

DETAILED DESCRIPTION

Figure 1A:
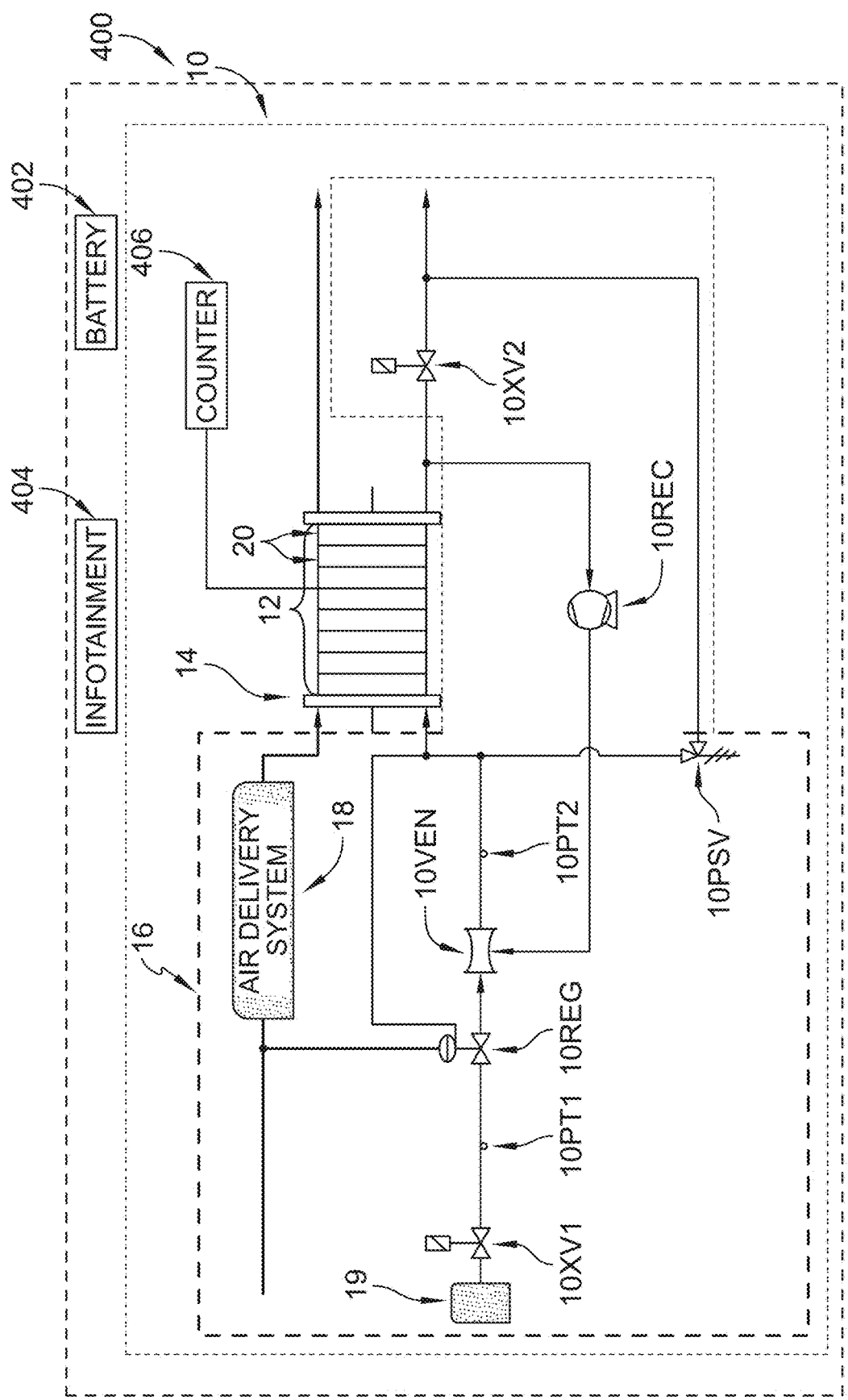
FIG. 1A is a schematic view of an exemplary fuel cell system including an air delivery system, a hydrogen delivery system, and a fuel cell module including a stack of multiple fuel cells.

As shown in FIG. 1A, fuel cell systems 10 often include one or more fuel cell stacks 12 ("STK") or fuel cell modules 14 connected to a balance of plant (BOP) 16, including various components, to support the electrochemical conversion, generation, and/or distribution of electrical power to help meet modern day industrial and commercial needs in an environmentally friendly way. As shown in FIGS. 1B and 1C, fuel cell systems 10 may include fuel cell stacks 12 comprising a plurality of individual fuel cells 20. Each fuel cell stack 12 may house a plurality of fuel cells 20 assembled together in series and/or in parallel. The fuel cell system 10 may include one or more fuel cell modules 14 as shown in FIGS. 1A and 1B.

Each fuel cell module 14 may include a plurality of fuel cell stacks 12 and/or a plurality of fuel cells 20. The fuel cell module 14 may also include a suitable combination of associated structural elements, mechanical systems, hardware, firmware, and/or software that is employed to support the function and operation of the fuel cell module 14. Such items include, without limitation, piping, sensors, regulators, current collectors, seals, and insulators.

The fuel cells 20 in the fuel cell stacks 12 may be stacked together to multiply and increase the voltage output of a single fuel cell stack 12. The number of fuel cell stacks 12 in a fuel cell system 10 can vary depending on the amount of power required to operate the fuel cell system 10 and meet the power need of any load. The number of fuel cells 20 in a fuel cell stack 12 can vary depending on the amount of power required to operate the fuel cell system 10 including the fuel cell stacks 12.

The number of fuel cells 20 in each fuel cell stack 12 or fuel cell system 10 can be any number. For example, the number of fuel cells 20 in each fuel cell stack 12 may range from about 100 fuel cells to about 1000 fuel cells, including any specific number or range of number of fuel cells 20 comprised therein (e.g., about 200 to about 800). In an embodiment, the fuel cell system 10 may include about 20 to about 1000 fuel cells stacks 12, including any specific number or range of number of fuel cell stacks 12 comprised therein (e.g., about 200 to about 800). The fuel cells 20 in the fuel cell stacks 12 within the fuel cell module 14 may be oriented in any direction to optimize the operational efficiency and functionality of the fuel cell system 10.

The fuel cells 20 in the fuel cell stacks 12 may be any type of fuel cell 20. The fuel cell 20 may be a polymer electrolyte membrane or proton exchange membrane (PEM) fuel cell, an anion exchange membrane fuel cell (AEMFC), an alkaline fuel cell (AFC), a molten carbonate fuel cell (MCFC), a direct methanol fuel cell (DMFC), a regenerative fuel cell (RFC), a phosphoric acid fuel cell (PAFC), or a solid oxide fuel cell (SOFC). In an exemplary embodiment, the fuel cells 20 may be a polymer electrolyte membrane or proton exchange membrane (PEM) fuel cell or a solid oxide fuel cell (SOFC).

In an embodiment shown in FIG. 1C, the fuel cell stack 12 includes a plurality of proton exchange membrane (PEM) fuel cells 20. Each fuel cell 20 includes a single membrane electrode assembly (MEA) 22 and a gas diffusion layers (GDL) 24, 26 on either or both sides of the membrane electrode assembly (MEA) 22 (see FIG. 1C). The fuel cell 20 further includes a bipolar plate (BPP) 28, 30 on the external side of each gas diffusion layers (GDL) 24, 26, as shown in FIG. 1C. The above-mentioned components, in particular the bipolar plate 30, the gas diffusion layer (GDL) 26, the membrane electrode assembly (MEA) 22, and the gas diffusion layer (GDL) 24 comprise a single repeating unit 50.

The bipolar plates (BPP) 28, 30 are responsible for the transport of reactants, such as fuel 32 (e.g., hydrogen) or oxidant 34 (e.g., oxygen, air), and cooling fluid 36 (e.g., coolant and/or water) in a fuel cell 20. The bipolar plates (BPP) 28, 30 can uniformly distribute reactants 32, 34 to an active area 40 of each fuel cell 20 through oxidant flow fields 42 and/or fuel flow fields 44 formed on outer surfaces of the bipolar plates (BPP) 28, 30. The active area 40, where the electrochemical reactions occur to generate electrical power produced by the fuel cell 20, is centered, when viewing the stack 12 from a top-down perspective, within the membrane electrode assembly (MEA) 22, the gas diffusion layers (GDL) 24, 26, and the bipolar plate (BPP) 28, 30.

Figure 1D:
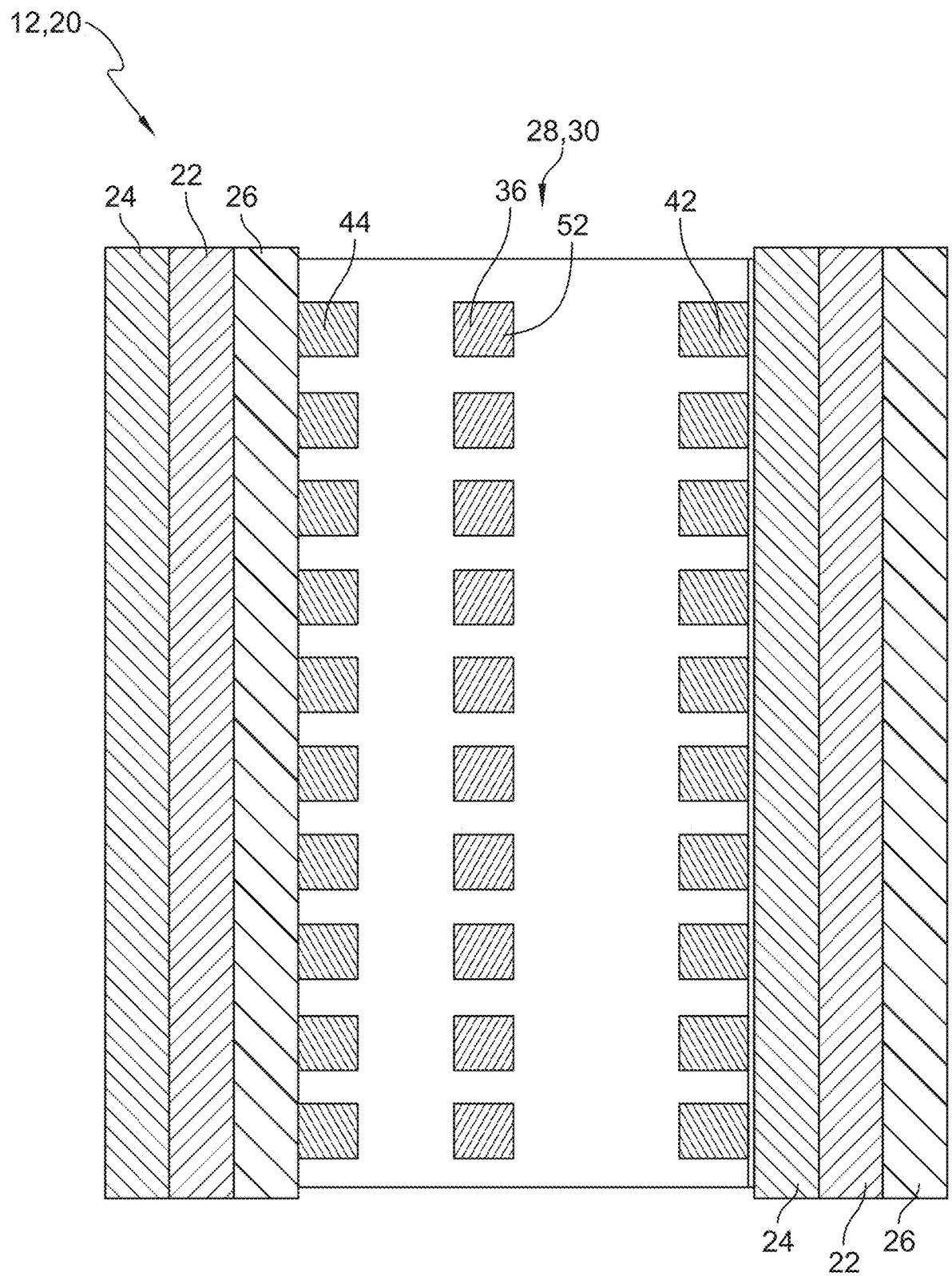
FIG. 1D is a cross-sectional view of an exemplary repeating unit of the fuel cell stack of FIG. 1C.

The bipolar plates (BPP) 28, 30 may each be formed to have reactant flow fields 42, 44 formed on opposing outer surfaces of the bipolar plate (BPP) 28, 30, and formed to have coolant flow fields 52 located within the bipolar plate (BPP) 28, 30, as shown in FIG. 1D. For example, the bipolar plate (BPP) 28, 30 can include fuel flow fields 44 for transfer of fuel 32 on one side of the plate 28, 30 for interaction with the gas diffusion layer (GDL) 26, and oxidant flow fields 42 for transfer of oxidant 34 on the second, opposite side of the plate 28, 30 for interaction with the gas diffusion layer (GDL) 24. As shown in FIG. 1D, the bipolar plates (BPP) 28, 30 can further include coolant flow fields 52 formed within the plate (BPP) 28, 30, generally centrally between the opposing outer surfaces of the plate (BPP) 28, 30. The coolant flow fields 52 facilitate the flow of cooling fluid 36 through the bipolar plate (BPP) 28, 30 in order to regulate the temperature of the plate (BPP) 28, 30 materials and the reactants. The bipolar plates (BPP) 28, 30 are compressed against adjacent gas diffusion layers (GDL) 24, 26 to isolate and/or seal one or more reactants 32, 34 within their respective pathways 44, 42 to maintain electrical conductivity, which is required for robust operation of the fuel cell 20 (see FIGS. 1C and 1D).

The fuel cell system 10 described herein, may be used in stationary and/or immovable power system, such as industrial applications and power generation plants. The fuel cell system 10 may also be implemented in conjunction with an air delivery system 18. Additionally, the fuel cell system 10 may also be implemented in conjunction with a hydrogen delivery system and/or a source of hydrogen 19 such as a pressurized tank, including a gaseous pressurized tank, cryogenic liquid storage tank, chemical storage, physical storage, stationary storage, an electrolysis system, or an electrolyzer. In one embodiment, the fuel cell system 10 is connected and/or attached in series or parallel to a hydrogen delivery system and/or a source of hydrogen 19, such as one or more hydrogen delivery systems and/or sources of hydrogen 19 in the BOP 16 (see FIG. 1A). In another embodiment, the fuel cell system 10 is not connected and/or attached in series or parallel to a hydrogen delivery system and/or a source of hydrogen 19.

In some embodiments, the fuel cell system 10 may include an on/off valve 10XV1, a pressure transducer 10PT1, a mechanical regulator 10REG, and a venturi 10VEN arranged in operable communication with each other and downstream of the hydrogen delivery system and/or source of hydrogen 19. The pressure transducer 10PT1 may be arranged between the on/off valve 10XV1 and the mechanical regulator 10REG. In some embodiments, a proportional control valve may be utilized instead of a mechanical regulator 10REG. In some embodiments, a second pressure transducer 10PT2 is arranged downstream of the venturi 10VEN, which is downstream of the mechanical regulator 10REG.

In some embodiments, the fuel cell system 10 may further include a recirculation pump 10REC downstream of the stack 12 and operably connected to the venturi 10VEN. The fuel cell system 10 may also include a further on/off valve 10XV2 downstream of the stack 12, and a pressure transfer valve 10PSV.

The present fuel cell system 10 may also be comprised in mobile applications. In an exemplary embodiment, the fuel cell system 10 is in a vehicle and/or a powertrain 400. A vehicle 400 comprising the present fuel cell system 10 may be an automobile, a pass car, a bus, a truck, a train, a locomotive, an aircraft, a light duty vehicle, a medium duty vehicle, or a heavy-duty vehicle. Type of vehicles 400 can also include, but are not limited to commercial vehicles and engines, trains, trolleys, trams, planes, buses, ships, boats, and other known vehicles, as well as other machinery and/or manufacturing devices, equipment, installations, among others.

The vehicle and/or a powertrain 400 may be used on roadways, highways, railways, airways, and/or waterways. The vehicle 400 may be used in applications including but not limited to off highway transit, bobtails, and/or mining equipment. For example, an exemplary embodiment of mining equipment vehicle 400 is a mining truck or a mine haul truck.

In addition, it may be appreciated by a person of ordinary skill in the art that the fuel cell system 10, fuel cell stack 12, and/or fuel cell 20 described in the present disclosure may be substituted for any electrochemical system, such as an electrolysis system (e.g., an electrolyzer), an electrolyzer stack, and/or an electrolyzer cell (EC), respectively. As such, in some embodiments, the features and aspects described and taught in the present disclosure regarding the fuel cell system 10, stack 12, or cell 20 also relate to an electrolyzer, an electrolyzer stack, and/or an electrolyzer cell (EC). In further embodiments, the features and aspects described or taught in the present disclosure do not relate, and are therefore distinguishable from, those of an electrolyzer, an electrolyzer stack, and/or an electrolyzer cell (EC).

The present disclosure is directed to systems and methods 100, 200, 500 of operating a fuel cell 20 in order to maximize range of a vehicle 400 associated with the fuel cell 20, as shown in FIGS. 2-8. This is accomplished via the disclosed fuel cell power control strategies 110, 210, as also shown in FIGS. 2-8. Specifically, the fuel cell power control strategies 110, 210 take into account the age of the fuel cell as well as state-of-charge of the battery 402 (e.g., FIG. 1A) of the vehicle 400 (e.g., FIG. 1A) in controlling power output of the fuel cell. Moreover, the method 500 includes operational steps for determining the efficiency of the fuel cell 20 based on its age, and operational steps for estimating the range of the fuel cell 20 and the vehicle 400 based on the efficiency and battery charge parameters.

Typically, power is supplied to the motor of the vehicle 400 from the battery 402 and the fuel cell 20, as shown in FIG. 1A. The operation of the fuel cell 20 must be managed in order to sustain charge of the battery 402 while also sufficiently powering the vehicle 400. As a fuel cell 20 operates over extended periods of time, the fuel cell 20 will degrade, thus effecting the efficiency of the fuel cell 20 as well as the range capabilities of the vehicle 400 utilizing the fuel cell 20.

The present disclosure addresses the issue of the fuel cell 20 degrading by operating the fuel cell 20 differently as the fuel cell 20 ages. In particular, depending on the state-of-charge of the battery 402, the fuel cell 20 is operated at a maximum efficiency point 130, 138, 146 and a charge-sustaining point 132, 140, 148. The maximum efficiency point 130, 138, 146 and the charge-sustaining point 132, 140, 148 may change based on the age of the fuel cell 20, and thus the power output of the fuel cell 20 may change depending on the maximum efficiency point 130, 138, 146 and the charge-sustaining point 132, 140, 148.

Operating the fuel cell 20 at these age-dependent maximum efficiencies and charge-sustaining points will maximize the range capabilities of the fuel cell 20 and thus the range of the fuel cell electric vehicle 400. In this way, maximum efficiency of the fuel cell 20 is achieved at all times, as well as maximizing fuel economy. Moreover, the disclosed strategy will avoid transient maneuvers of fuel cell 20, which is an important factor for fuel cell 20 aging. A transient maneuver is a rapid change in power of the fuel cell 20 (i.e. fuel cell 20 power output increasing from 0% to 100% in a few seconds).

Furthermore, as will be described in greater detail below, the age of the fuel cell 20 affects the efficiency of the fuel cell 20. The determination of the efficiency of the fuel cell 20, including the determination of the maximum efficiency (i.e. maximum efficiency points 130, 138, 146) of the fuel cell 20, based on its age is described below with respect to the method 500 and FIGS. 6 and 7. Moreover, the information regarding the age of the fuel cell 20 may be taken into account in estimating the current range of the fuel cell 20 and the vehicle 400, as will be described with regard to the method 500.

Figure 2:
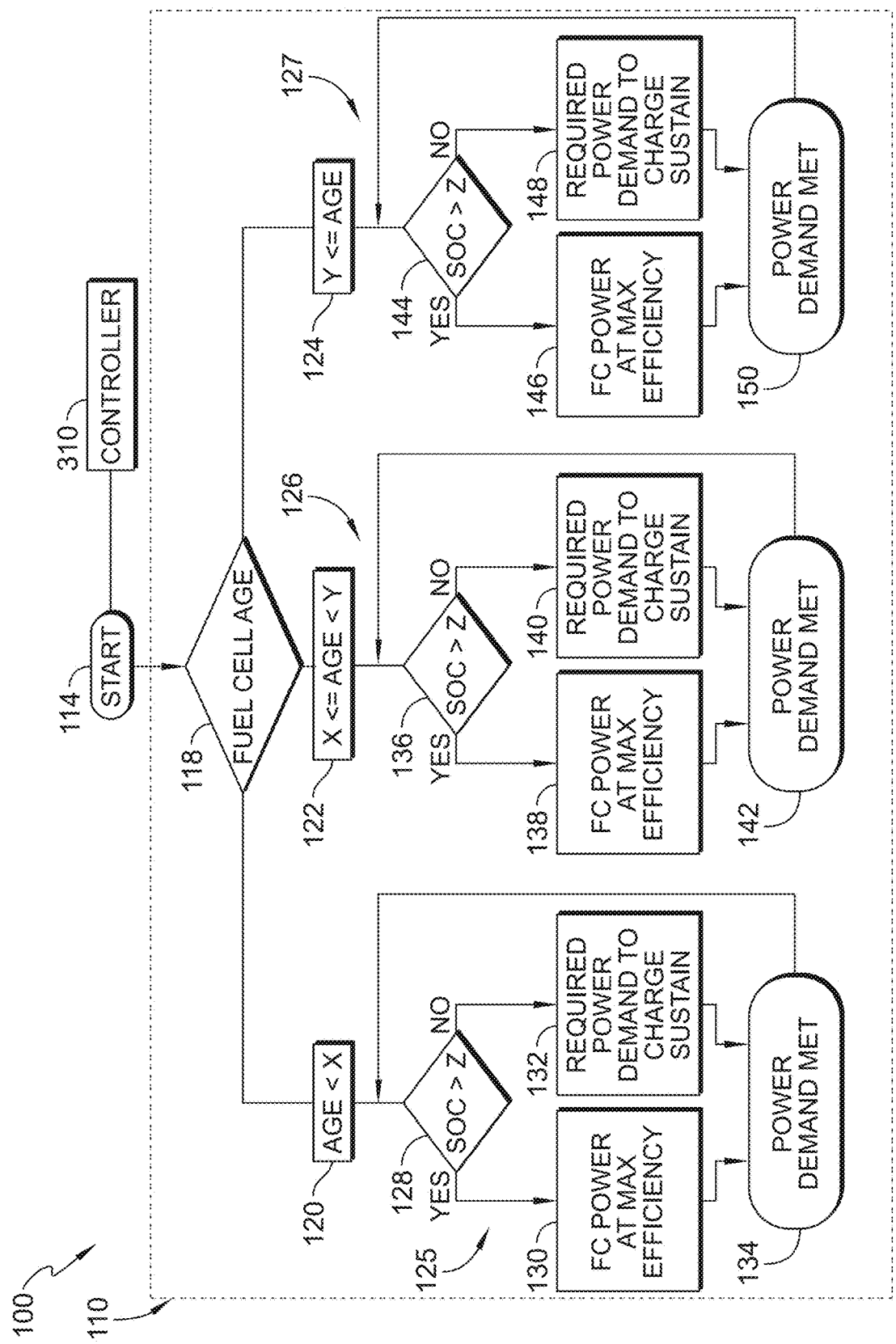
FIG. 2 is a flow chart diagram of a method of operating a fuel cell according to a first aspect of the present disclosure, including a fuel cell power control strategy.

FIG. 2 shows a method 100 of operating the fuel cell 20 or fuel cells 20 of a fuel cell electric vehicle 400. In this exemplary implementation of the method 100, the fuel cell power control strategy 110 includes three age-based power schemes 125, 126, 127 that are each based on a unique age range ("AGE<X," 120; "X<AGE<Y," 122; "Y<AGE," 124). A person skilled in the art will understand that greater or fewer than three age-based power schemes may be utilized based on the fuel cell, the vehicle, desired efficiency points, or other similar factors. As one non-limiting example, a particular fuel cell 20 may include two age-based power schemes, and in other non-limiting examples, may include four age-based power schemes, and in other non-limiting examples, may include five age-based power schemes. A person skilled in the art will understand these as merely exemplary, and that other numbers of age-based power schemes may be utilized based on the factors described above.

As shown in FIG. 2, the method 100 begins at a "Start" operational step 114, which may include a controller 310 receiving or sending instructions to begin the method 100, or the fuel cell 20 becoming operational. In the next operational step 118, the controller 310 is configured to determine a current total age of the fuel cell 20. In some embodiments, the current total age may be defined by a total time period that the fuel cell 20 has been operating over a lifespan of the fuel cell 20. In some embodiments, the age of the fuel cell 20 may be determined based on simulation data, historical data, or real-time measurement data of the fuel cell 20.

A person skilled in the art will understand that various methods may be utilized to determine the age of the current total age of the fuel cell 20. In one non-limiting example, a counter 406 (see FIG. 1A) is operably connected to the fuel cell 20 and is configured to continuously count the amount of time (i.e. hours, minutes, seconds, etc.) that the fuel cell 20 has been in operation, starting from 0. The amount of time that the fuel cell 20 has been in operation may also be referred to as a "runtime" of the fuel cell 20. In some embodiments, the amount of time that the fuel cell 20 has been in operation only includes time during which the fuel cell 20 is producing a positive power output (i.e. not at idle). In some embodiments, the current total age of the fuel cell 20 may be based on the kilowatt (kW)/hour (hr) throughput of the fuel cell 20.

In some embodiments, the controller 310 may be further configured to compare the determined age to at least one predetermined age threshold in order to determine which age-based power scheme 125, 126, 127 to utilize for the fuel cell 20, as shown in FIG. 2. Illustratively, the age thresholds are predetermined by the controller 310 and are based on the maximum efficiency points of the fuel cell 20 over its projected lifespan.

Specifically, the controller 310 may be configured to receive data regarding the predetermined maximum efficiency points 130, 138, 146, which change based on the age of the fuel cell 20. The reception of the data at the controller 310 may be carried out via wired or wireless connections to an internal or external data source (i.e. storage 313), via telematics configured to push updates to the controller 310 that include the data, and the like. Based on this received data, the controller 310 may be configured determine at what age of the fuel cell 20 to utilize the different maximum efficiency points 130, 138, 146 and charge-sustaining points 132, 140, 148 in order to maximize the range of the fuel cell 20 and the vehicle 400. These predetermined age thresholds may also be determined by an external processing device and sent to the controller 310. A person skilled in the art will understand that, in some embodiments, the predetermined age thresholds are based on a rate of degradation of the particular fuel cell 20 being utilized. Because different fuel cells 20 will have differing rates of degradation, the age thresholds are unique to the particular fuel cell 20 or fuel cells 20 being utilized.

In some embodiments, the age thresholds can be determined based on real-time data as opposed to being predetermined. For example, the controller 310 may be configured to monitor the operation of the fuel cell 20 over its lifetime, via measurement data of the fuel cell 20 and the vehicle 400, in order to dynamically determine in real-time at what age of the fuel cell 20 to utilize the different maximum efficiency points 130, 138, 146 and charge-sustaining points 132, 140, 148 in order to maximize the range of the fuel cell 20 and the vehicle 400.

In the exemplary implementation, the controller 310 may be configured to compare the determined age to two predetermined thresholds (shown as "X" and "Y" in FIG. 2). If the controller 310 determines that the determined age is less than the first predetermined threshold "X" (shown as sub-operation 120 in FIG. 2), then the method 100 will proceed to the first age-based power scheme 125, which will be described in greater detail below. The first predetermined threshold "X" may be a maximum age of the fuel cell 20 at which operating the fuel cell 20 at the first maximum efficiency point 130 and the first charge-sustaining point 132 remain the most efficient options for maximizing range of the fuel cell 20 and the vehicle 400.

If the determined age of the fuel cell 20 is at or above the first predetermined threshold "X," the controller 310 may be further configured to operate the fuel cell 20 in the second age-based power scheme 126, which includes the second maximum efficiency point 138 and the second charge-sustaining point 140, as shown in FIG. 2. In some embodiments, the controller 310 may be further configured to operate the fuel cell 20 in the second age-based power scheme 126 if the determined age of the fuel cell 20 is at or above the first predetermined threshold "X" and below the second predetermined threshold "Y" (shown as sub-operation 122 in FIG. 2). The second predetermined age threshold "Y" is greater than the first predetermined age threshold "X". Finally, the controller 310 may be further configured to operate the fuel cell 20 in the third age-based power scheme 127 if the determined age of the fuel cell 20 is at or above the second predetermined age threshold "Y". The third age-based power scheme 127 includes the third maximum efficiency point 146 and the third charge-sustaining point 148, as shown in FIG. 2

A person skilled in the art will understand that the values of the predetermined age thresholds "X" and "Y" and any other age thresholds are dependent on the specific fuel cell 20 being utilized in the vehicle 400 and its lifespan. In particular, in some embodiments, fuel cells 20 utilized in certain applications can have an average lifespan in a range of about 100 hours to about 100,000 hours, including any particular value or range therebetween. For example, fuel cells 20 utilized in certain applications such as heavy-duty vehicles can have an average lifespan within a range of about 20,000 hours to about 30,000 hours, including any particular value or range therebetween. As such, in one non-limiting example, "X" (the first predetermined age threshold) may be within a range of about 5,000 hours to about 15,000 hours, and "Y" (the second predetermined age threshold) may be within a range of about 15,000 hours to about 25,000 hours, including any particular value or range therebetween. A person skilled in the art will understand these ranges and values as merely exemplary, and that other ranges and values may be utilized based on the particular fuel cell 20 or fuel cells 20 being utilized.

As discussed above, the three age-based power schemes 125, 126, 127 are each utilized in a unique age range ("AGE<X," 120; "X<=AGE<Y," 122; "Y<=AGE," 124), and are each configured to operate the fuel cell 20 based on specific operation parameters, including the maximum efficiency points 130, 138, 146 and charge-sustaining points 132, 140, 148. In some embodiments, the age being less than "X" may be considered a "beginning-of-life" age range of the fuel cell 20, the age being greater than or equal to "X" and less than "Y" may be considered a "mid-life" age range of the fuel cell 20, and the age being greater than or equal to "Y" may be considered an "end-of-life" age range of the fuel cell 20.

As can be seen in FIG. 2, each age-based power scheme 125, 126, 127 is configured to operate in a loop throughout the time the fuel cell 20 is within the age range of that power scheme 125, 126, 127. In some embodiments, each loop of the age-based power scheme 125, 126, 127 may be repeated periodically (i.e. the first sub-operation 128, 136, 144 of determining the state-of-charge of the battery 402 described below is repeated over specific time intervals) and change the operation of the fuel cell 20 from the max efficiency points 130, 138, 146 to the charge-sustaining points 132, 140, 148 and vice versa. In some embodiments, each loop of the age-based power scheme 125, 126, 127 may be repeated continuously (i.e. the first sub-operation 128, 136, 144 of determining the state-of-charge of the battery 402 described below is repeated continuously) and dynamically change the operation of the fuel cell 20 from the max efficiency points 130, 138, 146 to the charge-sustaining points 132, 140, 148 and vice versa.

As shown in FIG. 2, after the controller 310 determines which age range the fuel cell 20 falls into, the method 100 and the fuel cell power control strategy 110 proceed to the respective age-based power scheme 125, 126, 127 associated with the determined age range. Each age-based power scheme 125, 126, 127 includes a first sub-operation 128, 136, 144 of determining, via the controller 310, a state-of-charge of the battery 402 associated with the fuel cell 20 and the vehicle 400.

In the exemplary implementation, the first sub-operation 128, 136, 144 of each age-based power scheme 125, 126, 127 includes a determination as to whether the state-of-charge ("SOC") is greater than value "Z," which may be a predetermined charge threshold. In this embodiment, the value "Z" is the same for each age-based power scheme 125, 126, 127. The value of "Z" may be based on the particular fuel cell 20 and battery 402 being utilized, and may be directly dependent on the associated charge-sustaining point 132, 140, 148 of that age-based power scheme 125, 126, 127.

In some embodiments, the value of "Z" is within a range of about 50% battery charge to about 99% battery charge, and any range or value therebetween. In some embodiments, the value of "Z" is within a range of about 60% battery charge to about 95% battery charge, and any range or value therebetween. In some embodiments, the value of "Z" is within a range of about 70% battery charge to about 90% battery charge, and any range or value therebetween. In some embodiments, the value of "Z" is within a range of about 80% battery charge to about 90% battery charge, and any range or value therebetween. In some embodiments, the value of "Z" is about 85%. A person skilled in the art will understand these ranges and values as merely exemplary, and that other ranges and values of the "Z" value may be utilized based on the particular fuel cell 20 or fuel cells 20 being utilized. A person skilled in the art will also understand that the value "Z" may be different for each age-based power scheme 125, 126, 127, as the age of the fuel cell 20 can affect the particular state-of-charge ("SOC") threshold that determines when to switch between the max efficiency points 130, 138, 146 and the charge-sustaining points 132, 140, 148.

For the first age-based power scheme 125, if the state-of-charge is above the value "Z," the controller 310 operates the fuel cell 20 at the first maximum efficiency point 130, which will be described in greater detail below. If the state-of-charge is at or below the value "Z," the controller 310 operates the fuel cell 20 such that the battery 402 operates in a charge-sustaining mode (e.g., at the charge-sustaining point 132), which will also be described in greater detail below.

Similarly, for the second age-based power scheme 126, if the state-of-charge is above the value "Z," the controller 310 operates the fuel cell 20 at the first maximum efficiency point 138. If the state-of-charge is at or below the value "Z," the controller 310 operates the fuel cell 20 such that the battery 402 operates in a charge-sustaining mode (e.g., at the charge-sustaining point 140).

Similarly, for the third age-based power scheme 127, if the state-of-charge is above the value "Z," the controller 310 operates the fuel cell 20 at the first maximum efficiency point 146. If the state-of-charge is at or below the value "Z," the controller 310 operates the fuel cell 20 such that the battery 402 operates in a charge-sustaining mode (e.g., at the charge-sustaining point 148).

Each maximum efficiency point 130, 138, 146 includes a corresponding maximum efficiency power output of the fuel cell 20. In some embodiments, the maximum efficiency power output is different for each age-based power scheme 125, 126, 127. Illustratively, the maximum efficiency power output increases for each age-based power scheme 125, 126, 127.

In at least some embodiments, the first maximum efficiency point 130 corresponds to a first power output of the fuel cell 20 and the second maximum efficiency point 138 corresponds to a second power output of the fuel cell 20 which is greater than the first power output. The third maximum efficiency point 146 corresponds to a third power output of the fuel cell 20 greater than the first and second power outputs. In some embodiments, the first, second, and third power outputs are a percentage of the peak (i.e. maximum possible) power output of the particular fuel cell 20 being utilized.

As a non-limiting example, the first, second, and third power outputs may be in a range of about 1% to about 50% of the peak power output of the fuel cell 20, and any range or value therebetween. As a further non-limiting example, the first, second, and third power outputs may be in a range of about 1% to about 40% of the peak power output of the fuel cell 20, and any range or value therebetween. As another non-limiting example, the first, second, and third power outputs may be in a range of about 1% to about 30% of the peak power output of the fuel cell 20, and any range or value therebetween. As an additional non-limiting example, the first, second, and third power outputs may be in a range of about 1% to about 20% of the peak power output of the fuel cell 20, and any range or value therebetween.

In some embodiments, the third power output is greater than the first and second power outputs, and the second power output is greater than the first power output. For example, the first power output may be in a range of about 1% to about 20% of the peak power output of the fuel cell 20, the second power output may be in a range of about 5% to about 25% of the peak power output of the fuel cell 20, and the third power output may be in a range of about 15% to about 30% of the peak power output of the fuel cell 20, and any range or value therebetween. As a further example, the first power output may be in a range of about 1% to about 10% of the peak power output of the fuel cell 20, the second power output may be in a range of about 5% to about 15% of the peak power output of the fuel cell 20, and the third power output may be in a range of about 15% to about 30% of the peak power output of the fuel cell 20, and any range or value therebetween. A person skilled in the art will understand these ranges and values as merely exemplary, and that other ranges and values of the first, second, and third power outputs may be utilized based on the particular fuel cell 20 or fuel cells 20 being utilized.

The maximum efficiency points 130, 138, 146 are predetermined, either via the controller 310 or an external processing device, and are based on predetermined efficiency data of the fuel cell 20. The maximum efficiency points 130, 138, 146 can be predetermined by the controller 310 or an external processing device based on simulation data, historical data, or real-time measurement data of the fuel cell 20.

In some embodiments, the maximum efficiency points 130, 138, 146 of a fuel cell 20 are characterized by a mapping exercise where efficiency is either simulated or experimentally determined at a stack and engine level. In some embodiments, the controller 310 or an external processing device may utilize one or more of net power, fuel consumption, coolant temperature, or fuel cell stack heat rejection in order to determine the maximum efficiency points 130, 138, 146 of the fuel cell 20. As a non-limiting example, real time data acquired via a telematics device can be post-processed over a cloud-based computing network in which optimization and/or machine learning methods (i.e., neural networks) may be utilized to dynamically determine the maximum efficiency points 130, 138, 146 based on the fuel cell 20 age. As described above, the age of the fuel cell 20 may also be dynamically determined.

As a non-limiting example, the controller 310 or an external processing device may perform a sweep of an engine associated with the fuel cell 20 at a steady state condition from minimum power to max power and determine the efficiency from this sweep. This process can be repeated at different fuel cell 20 ages and can produce a data map of efficiencies at different ages. As a further non-limiting example, in order to determine the maximum efficiency points 130, 138, 146 of the fuel cell 20 described above, the controller 310 may carry out the operational steps of method 500 described below. Although the method steps and equations associated with method 500 are determining the efficiency based on instantaneous determinations of power output of the fuel cell 20, the same method steps and equations may be iteratively carried out in order to determine the maximum efficiency points 130, 138, 146 of the fuel cell 20. In other embodiments, the maximum efficiency points 130, 138, 146 of the fuel cell 20 may be determined via a lookup table or lookup graph including predetermined maximum efficiency values.

Similar to the maximum efficiency points 130, 138, 146, the charge-sustaining points 132, 140, 148, i.e. the operation of the fuel cell 20 such that the battery 402 operates in a charge-sustaining mode, are also predetermined, either via the controller 310 or an external processing device. The charge-sustaining points 132, 140, 148 have corresponding power outputs of the fuel cell 20 that are equal to the required power output to charge sustain of the battery 402.

The controller 310 is configured to also take into account the state of health of the battery 402 in determining both the charge-sustaining points 132, 140, 148 and the predetermined charge threshold (value "Z" in FIG. 2). As a non-limiting example, the state of health of the battery 402 may be equal to 100% at the beginning-of-life, about 95% at the mid-life, and about 90% at the end-of-life of the fuel cell 20. These state of health percentages of the fuel cell 20 may be utilized by the controller 310 in order to modify the charge-sustaining points 132, 140, 148 and the predetermined charge threshold (value "Z" in FIG. 2) accordingly.

Similar to the first power output of the first maximum efficiency point 130, the second power output of the second maximum efficiency point 138, and the third power output of the third maximum efficiency point 146, as described above, the corresponding power output of each charge-sustaining points 132, 140, 148 can also be determined as a percentage of the peak power output of the fuel cell 20. A person skilled in the art will understand that each charge-sustaining point 132, 140, 148 power output may be the same or different based on the particular fuel cell 20, battery 402, and vehicle 400 being utilized.

As one non-limiting example, the power output for each charge-sustaining point 132, 140, 148 may be in a range of about 25% to 100% of the peak power output of the fuel cell 20, and any range or value therebetween. In some embodiments, the power output for each charge-sustaining point 132, 140, 148 may be in a range of about 35% to about 90% of the peak power output of the fuel cell 20, and any range or value therebetween. In some embodiments, the power output for each charge-sustaining point 132, 140, 148 may be in a range of about 45% to about 80% of the peak power output of the fuel cell 20, and any range or value therebetween. In some embodiments, the power output for each charge-sustaining point 132, 140, 148 may be in a range of about 55% to about 70% of the peak power output of the fuel cell 20, and any range or value therebetween. A person skilled in the art will understand these ranges and values as merely exemplary, and that other ranges and values of the power output of each charge-sustaining point 132, 140, 148 may be utilized based on the particular fuel cell 20 or fuel cells 20 being utilized.

After the fuel cell 20 operates at either the maximum efficiency point 130, 138, 146 or the charge-sustaining point 132, 140, 148 for a predetermined period of time, the method 100 and the fuel cell power control strategy 110 proceed to a state 134 in which the controller 310 determines that the power demand of the vehicle 400 has been met. After this state 134, the particular age-based power scheme 125, 126, 127 repeats (e.g., loops) by returning to the determination of the state-of-charge sub-operation 128, 136, 144.

Figure 3A:
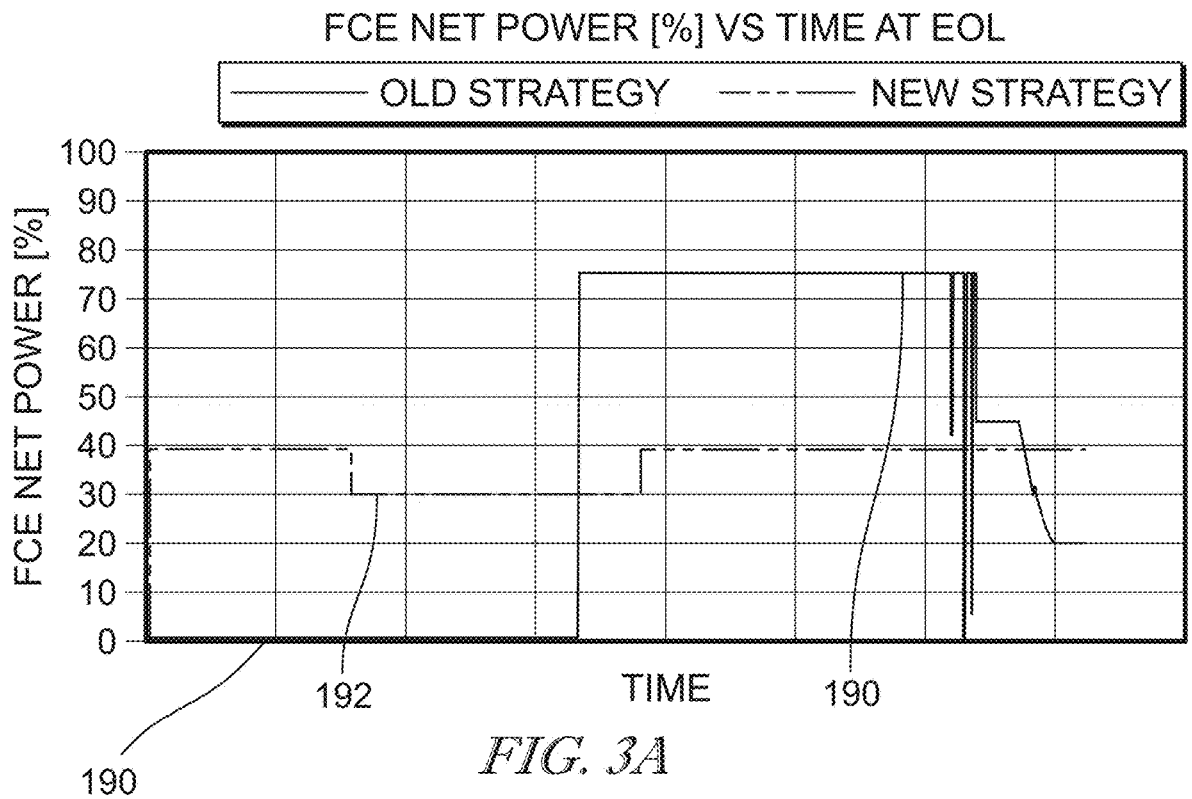
FIG. 3A is a graph showing a known fuel cell power control strategy compared to the fuel cell power control strategy of FIG. 2, showing fuel cell power output versus time for an exemplary duty cycle.
Figure 3B:
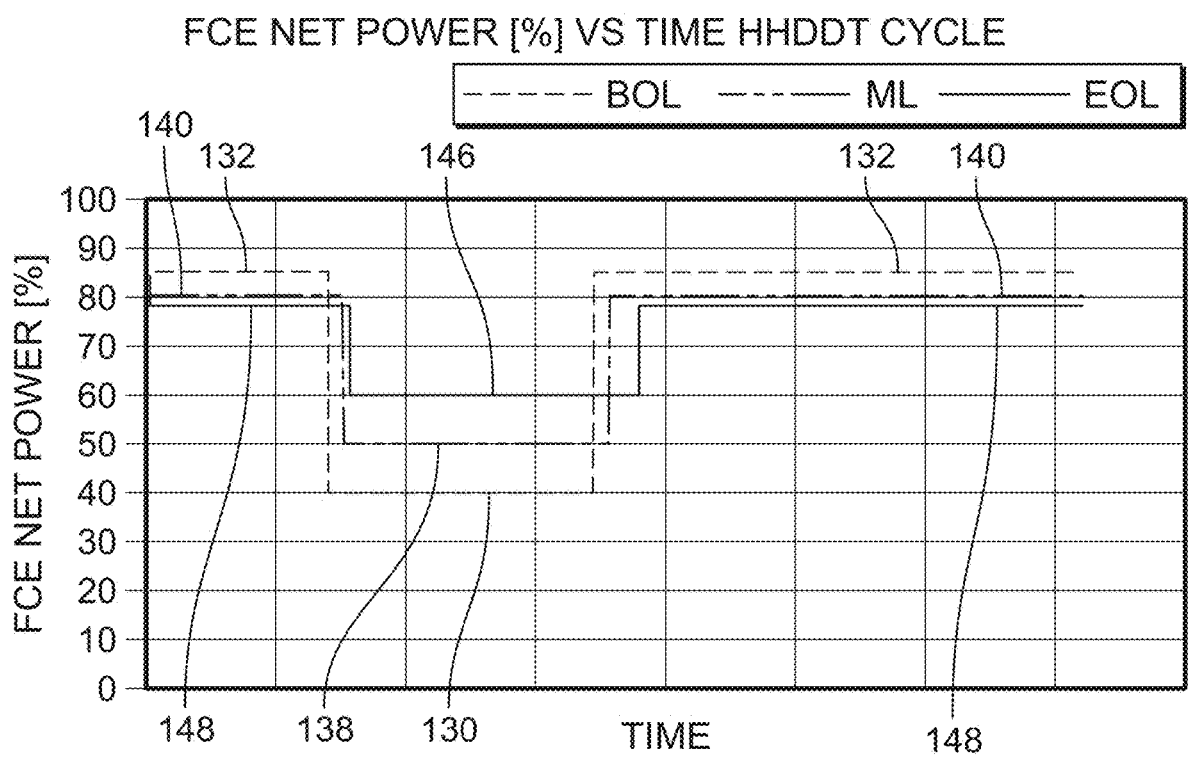
FIG. 3B is a graph showing the fuel cell power control strategy of FIG. 2, showing different power schemes for different ages of the fuel cell.

FIG. 3A shows a graph of a known fuel cell power control strategy, showing fuel cell power output versus time for an exemplary duty cycle of a vehicle 400. FIG. 3B shows a graph of the fuel cell power control strategy described above, also showing fuel cell power output versus time during the exemplary duty cycle. A duty cycle is a definition of the overall usage of a vehicle over a certain period of time, such as hours per time period, days per week, total miles per time period, typical load profile, peak load profile, and similar data. As a non-limiting example, a duty cycle may be measured by a particular driving session, from when the vehicle 400 is started to when the vehicle 400 is shut off. In some embodiments, this driving session may include a full loop of a route, such as driving from point A to point B and then back to point A. Duty cycles are typically measured in terms of vehicle speed versus time.

The exemplary duty cycle shown in FIGS. 3A and 3B includes a time period of usage of the vehicle 400. As shown in FIG. 3A, the known fuel cell power control strategy 190 includes many transient events and spikes of power output. Conversely, the fuel cell power control strategy 192, as described herein, produces a constant power output corresponding to the power output required to sustain charge of the battery 402, i.e. one of the charge-sustaining points 132, 140, 148. The fuel cell power control strategy 192 includes a lower, constant power output, which corresponds to the power output required for one of the maximum efficiency points 130, 138, 146.

FIG. 3B shows additional details regarding the fuel cell power control strategy shown in FIG. 2 and described above. Over the course of the duty cycle, the power output shifts between two points, the higher point being the power output corresponding to the charge-sustaining points (shown as 132, 140, 148 in FIG. 3B), and the lower point being the power output corresponding to the maximum efficiency points (shown as 130, 138, 146 in FIG. 3B).

As can be seen in FIG. 3B, in at least this exemplary embodiment, the power output corresponding to the charge-sustaining points 132, 140, 148 decreases as the fuel cell 20 ages. In particular, the first power output corresponding to the first charge-sustaining point 132 is greater than the second power output corresponding to the second charge-sustaining point 140. The second power output corresponding to the second charge-sustaining point 140 is greater than the third power output corresponding to the third charge-sustaining point 148.

Similarly, as can also be seen in FIG. 3B, in at least this exemplary embodiment, the power output corresponding to the maximum efficiency points 130, 138, 146 increases as the fuel cell 20 ages. In particular, the first power output corresponding to the first maximum efficiency point 130 is less than the second power output corresponding to the second maximum efficiency point 138. The second power output corresponding to the second maximum efficiency point 138 is less than the third power output corresponding to the third maximum efficiency point 146.

In some embodiments, during the operation of the fuel cell in a first duty cycle environment, the operating of the fuel cell 20 such that the battery operates in a charge-sustaining mode corresponds to a charge-sustaining power output of one of the charge-sustaining points 132, 140, 148 of the fuel cell 20. This power output is greater than the maximum efficiency power output corresponding to the associated maximum efficiency point 130, 138, 146 of the fuel cell 20.

The time period at which the state-of charge of the battery 402 is at or below the value "Z" may be a first period of time, and the time period at which the state-of charge of the battery 402 is above the value "Z" may be a second period of time. During the first period of time, which include the time periods represented by the relatively higher values of FCE net power outside of the lower minimum of the square wave (i.e., the upper, maximum values of the square wave where the charge-sustaining points 132, 140, 148 are located), the controller 310 may operate the fuel cell 20 at the charge-sustaining power output described in the previous paragraph. Similarly, during the second time period, which includes the time period represented by the relatively lower values of FCE net power outside of the higher maximums of the square wave (i.e., the lower dip of the square wave where the maximum efficiency points 130, 138, 146 are located), the controller 310 may operate the fuel cell 20 at the maximum efficiency power output also described in the previous paragraph. Each power output associated with the charge-sustaining points 132, 140, 148 and the maximum efficiency points 130, 138, 146 are based on the age of the fuel cell 20, as described above. As can be seen in FIG. 3B, the time periods differ based on the age of the fuel cell 20. For example, the first period of time at the end-of-life of the fuel cell 20 is longer than the first period of time at the beginning-of-life and mid-life of the fuel cell 20.

Generally, controlling the fuel cell 20 to operate between these two age-based power outputs during a duty cycle, as shown in FIGS. 2 and 3B, results in fewer transient events as compared to known fuel cell power control strategies, which will reduce the aging effects on the fuel cell 20. Operating the fuel cell 20 in the manner described herein will also optimize efficiency of the fuel cell 20 and maximize the range of the vehicle 400 utilizing the fuel cell 20. Fuel economy is also improved with the methods described herein. Moreover, as the fuel cell 20 ages, the control algorithm change leads to a smaller operating current and/or cell voltage range, which is expected to reduce fuel cell degradation.

Figure 4:
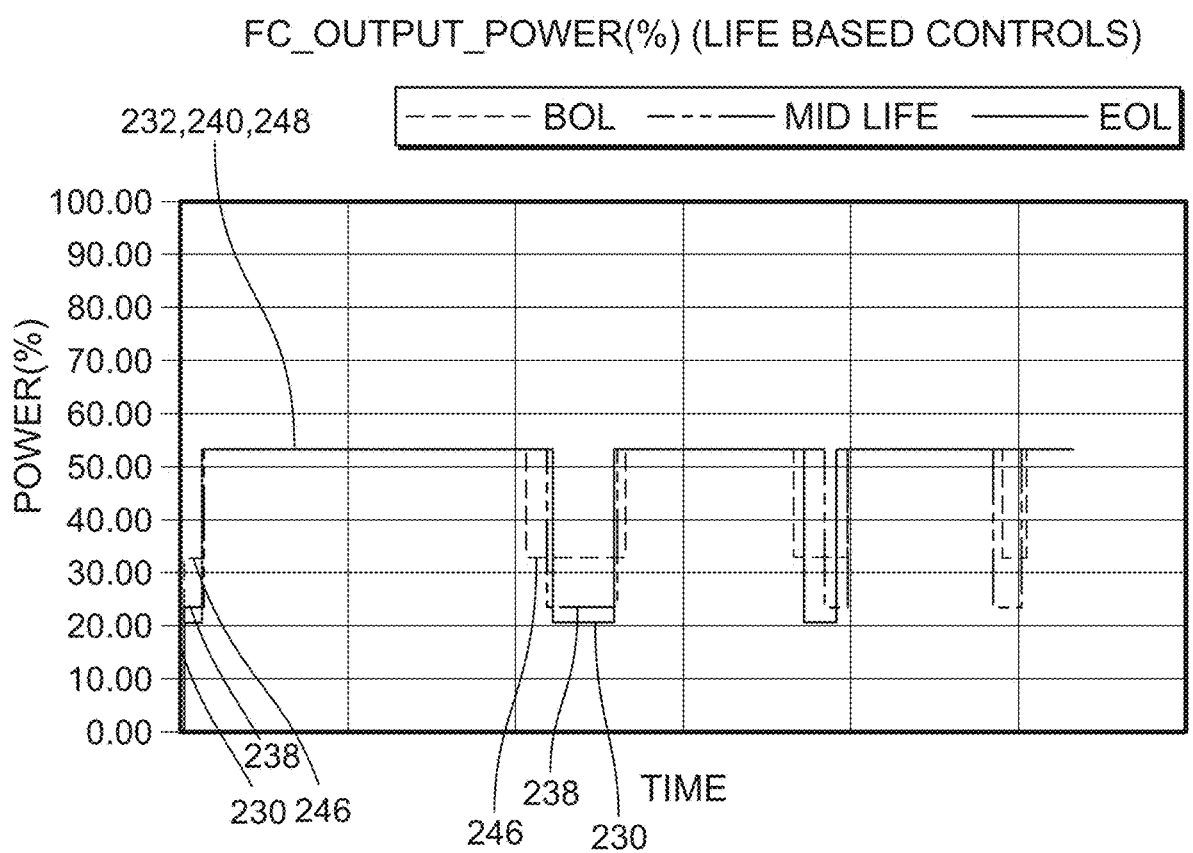
FIG. 4 is a graph showing a fuel cell power control strategy according to a further aspect of the present disclosure, in particular showing fuel cell power output versus time for an exemplary duty cycle.
Figure 5:
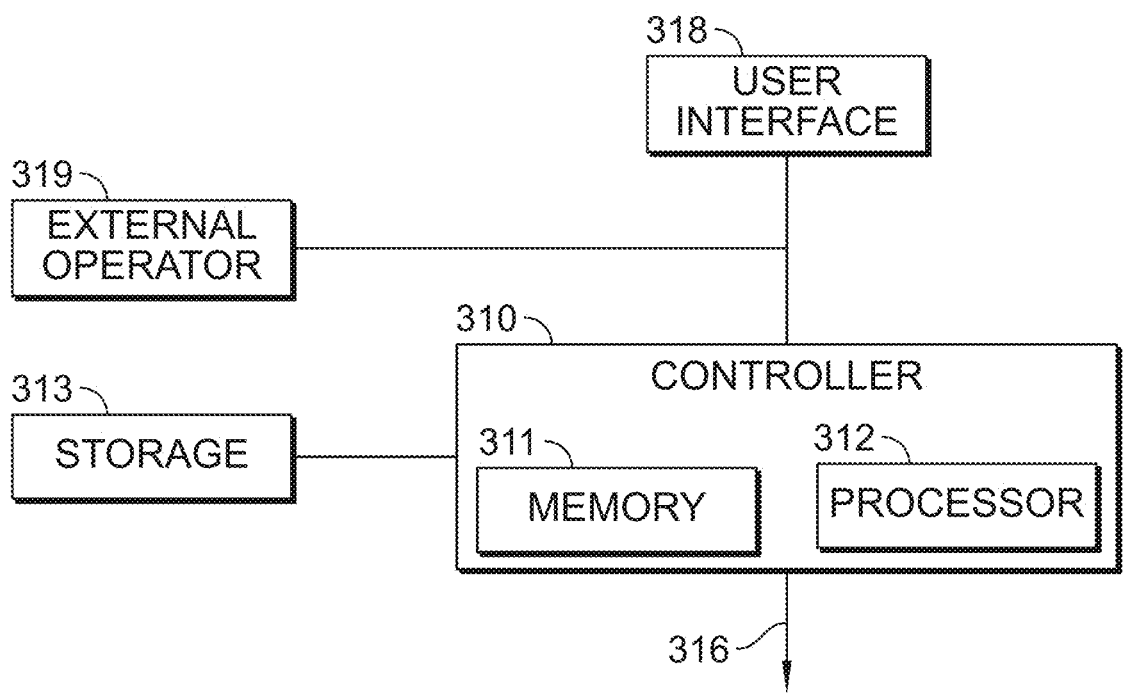
FIG. 5 is a schematic view of a controller and related components configured to be utilized with the fuel cell power control strategies of FIGS. 2-9.

FIG. 4 is a graph showing a fuel cell power control strategy 210 and method 200 according to a further aspect of the present disclosure, in particular showing fuel cell power output versus time for an exemplary duty cycle. The fuel cell power control strategy 210 and method 200 is substantially similar to the fuel cell power control strategy 110 and method 100 described herein. Accordingly, the description of the fuel cell power control strategy 110 and method 100 is incorporated by reference to apply to the fuel cell power control strategy 210 and method 200, except in instances when it conflicts with the specific description of the fuel cell power control strategy 210 and method 200.

FIG. 4 shows a control strategy similar to the strategy shown in FIG. 3B. Specifically, when the state-of-charge of the battery 402 ("Z" value) is at or below a predetermined charge threshold, the controller 310 operates the fuel cell 20 with a power output corresponding to the charge-sustaining points 232, 240, 248 (e.g. in range between about 50% and about 55%). When the state-of-charge of the battery 402 is above the predetermined charge threshold, the controller 310 operates the fuel cell 20 with a power output corresponding to the maximum efficiency points 230, 238, 246 (e.g. in a range between about 20% to about 25% for beginning-of-life, in a range of about 22% to about 28% for mid-life, and in a range of about 30% to about 35% for end-of-life).

Similar to the fuel cell power control strategy 110 and method 100, each of these points 230, 232, 238, 240, 246, 248 is dependent on the age of the fuel cell 20. Also, similar to FIG. 3B, the time periods in which the state-of-charge of the battery 402 ("Z" value) is at, above, or below the predetermined charge threshold may differ based on the age of the fuel cell 20 and based on a point in time during the duty cycle, as shown in FIG. 4. For example, a first period of time period (i.e. the time period at which the state-of charge of the battery 402 is at or below the value "Z") generally becomes shorter as the duty cycle progresses, and also varies based on age of the fuel cell 20, as shown in FIG. 4. For example, a second period of time period (i.e. the time period at which the state-of charge of the battery 402 is above the value "Z") generally becomes shorter as the duty cycle progresses, as shown in FIG. 4. These time periods are represented in the graph of FIG. 4 similar to how the time periods represented in the graph of FIG. 3B, in particular with the minimums and maximums of the square wave that represent operating at the charge-sustaining points 232, 240, 248 or the maximum efficiency points 230, 238, 246 defining the time periods.

The controller 310, as described above, is shown in FIG. 5. The controller 310 may include a memory 311, and a processor 312. The memory 311 and processor 312 are in communication with each other. The processor 312 may be embodied as any type of computational processing tool or equipment capable of performing the functions described herein. For example, the processor 312 may be embodied as a single or multi-core processor(s), digital signal processor, microcontroller, or other processor or processing/controlling circuit.

The memory 311 may be embodied as any type of volatile or non-volatile memory or data storage capable of performing the functions described herein, and may include additional storage 313. Moreover, the controller 310 may also include additional or alternative components, such as those commonly found in a computer (e.g., various input/output devices, resistors, capacitors, etc.). In other embodiments, one or more of the illustrative controllers 310 of components may be incorporated in, or otherwise form a portion of, another component. For example, the memory 311, or portions thereof, may be incorporated in the processor 312.

In operation, the memory 311 may store various data and software used during operation of the controller 310 such as operating systems, applications, programs, libraries, and drivers. The memory 311 is communicatively coupled to the processor 312 via an I/O subsystem, which may be embodied as circuitry and/or components to facilitate input/output operations with the processor 312, the memory 311, and other components of the controller 310. In one embodiment, the memory 311 may be directly coupled to the processor 312, for example via an integrated memory controller hub. Additionally, in some embodiments, the I/O subsystem may form a portion of a system-on-a-chip (SoC) and be incorporated, along with the processor 312, the memory 311, and/or other components of the controller 310, on a single integrated circuit chip (not shown).

The components of the communication network 316 may be configured to use any one or more communication technologies (e.g., wired, wireless and/or power line communications) and associated protocols (e.g., Ethernet, InfiniBand®, Bluetooth®, Wi-Fi®, WiMAX, 3G, 4G LTE, 5G, etc.) to effect such communication among and between system components and devices as described above, including but not limited to between a user interface 318 and the controller 310.

Figure 6:
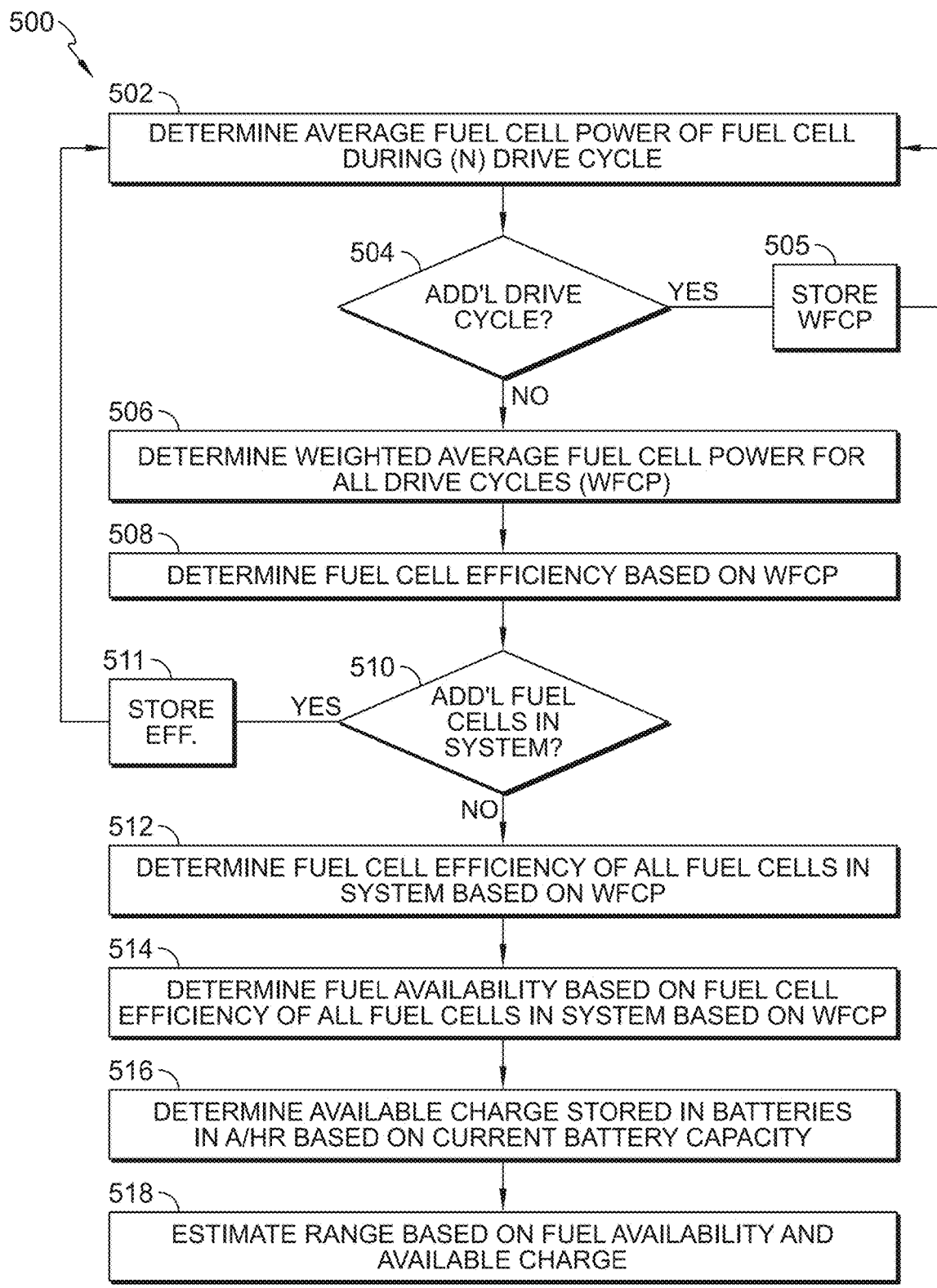
FIG. 6 is a flow chart diagram of a method for determining the efficiency of a fuel cell based on age, and estimating the range of the fuel cell based on efficiency and battery charge parameters.
Figure 7:
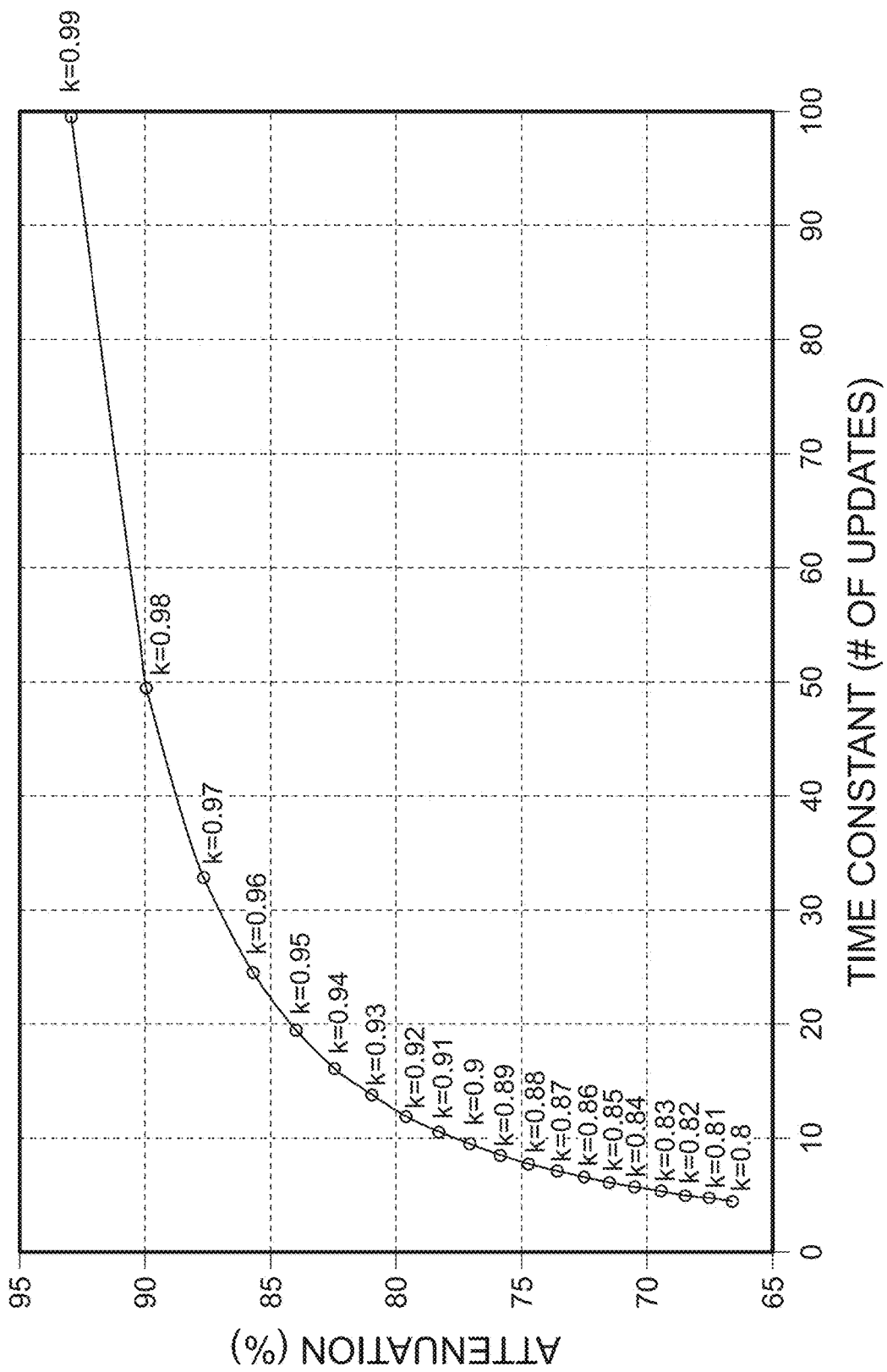
FIG. 7 is a graph of time constants versus attenuation percentage for different filter constant values.

A method 500 of estimating the range of the fuel cell 20 (or fuel cells 20) and the vehicle 400 according to a further aspect of the present disclosure is shown in FIGS. 6 and 7. The method 500 determines the efficiency of the fuel cell 20 or fuel cells 20 based on age, and also estimates the range of the fuel cell 20 or fuel cells 20 and the vehicle 400 based on the efficiency and battery charge parameters. In some embodiments, the operational steps 502, 504, 506, 508, 510, and 512 of the method 500 may be utilized by the methods 100, 200 described above in order to determine the maximum efficiency points 130, 138, 146.

The method 500 may utilize the controller 310 or the external processing device described above, each of which is configured to carry out the operational steps of the method 500 described below. A person skilled in the art will understand that, although the description of the method 500 only references the controller 310, any processing device, either within the vehicle 400 or external to the vehicle 400, may be utilized to carry out the method 500. Moreover, a person skilled in the art will understand that, although the description of the method 500 generally references a single fuel cell 20 utilized in the vehicle 400, any number of fuel cells 20 may be utilized to power the vehicle 400.

As shown in FIG. 6, the method 500 begins with a first operational step 502, in which the controller 310 is configured to determine an average of fuel cell power of the fuel cell 20 for a current drive cycle (i.e. "(N) DRIVE CYCLE" in FIG. 6; "Avg_FCE_Power$_k$" in Equation 1) of the fuel cell 20 and the vehicle 400. A "drive cycle" of the fuel cell 20 refers to a time period between a "key on" and a "key off" event of the vehicle 400 (i.e. when the vehicle 400 is started and then subsequently shut off). A non-limiting example of a drive cycle may include a vehicle 400 trip from a user's home to the user's work office.

Specifically, the average of fuel cell power for the current drive cycle is a rolling average of instantaneous power delivered by the fuel cell 20, as calculated by Equation 1 below:

$$\text{Avg\_FCE\_Power}_k = \frac{\sum(\text{FCE\_Power}_{instantaneous})}{\text{number of samples}} \quad (1)$$

In Equation 1, "FCE_Power$_{instantaneous}$" is the instantaneous power at a particular time during the current drive cycle, and "number of samples" is the total number of samples of this instantaneous power that are measured over the current drive cycle. The subscript (k) is indicative of the current drive cycle in which the fuel cell 20 and vehicle 400 are being operated. In some embodiments, the controller 310 is configured to recalculate and update the average of fuel cell power ("Avg_FCE_Power$_k$") after each sample of the instantaneous power is measured.

It may be advantageous to run the fuel cell 20 and vehicle 400 through additional drive cycles in order to refine the data (i.e. samples of the instantaneous power) and determine a more accurate average of fuel cell power based on multiple drive cycles. Accordingly, in some embodiments, at the end of the current drive cycle, the method 500 proceeds to operational step 504, in which the controller 310 determines whether additional drive cycles are to be executed in order to take additional samples of the instantaneous power over the next drive cycle. If the controller 310 determines that an additional drive cycle is to be executed, the method 500 returns to operational step 502 in which the controller 310 will determine an average of fuel cell power for the next drive cycle. If additional drive cycles are not to be executed, the method 500 can proceed to operational step 506.

At the end of each drive cycle, the controller 310 is further configured to store the most recently determined average of fuel cell power ("Avg_FCE_Power$_k$") at operational step 505, as shown in FIG. 6. In some embodiments, the data regarding the most recently determined average of fuel cell power ("Avg_FCE_Power$_k$") may be stored in the memory 311 of the controller 310, as described above. The controller 310 may access the determined average of fuel cell power ("Avg_FCE_Power$_k$") for subsequent calculations, as will be described with regard to operational step 506 below.

The number of drive cycles to be executed by the fuel cell 20 and vehicle 400 in determining the average of fuel cell power may be predetermined. In some embodiments, only a single drive cycle is executed in order to determine the average of fuel cell power, while in other embodiments, two, three, four, or more drive cycles are executed.

After all drive cycles and averages ("Avg_FCE_Power$_k$") are determined and stored, the controller 310 is configured to carry out operational step 506 of the method 500, as shown in FIG. 6. In operational step 506, the controller 310 is configured to determine the weighted average of fuel cell power at the end of the most recent drive cycle (i.e. "current drive cycle") ("WFCP"), as calculated by Equation 2 below:

$$\text{Avg\_FCE\_Power}_{weighted_k}(WFCP) = \qquad (2)$$
$$(1-\alpha) * \text{Avg\_FCE\_Power}_k + \alpha * \text{Avg\_FCE\_Power}_{weighted_{k-1}}$$

Equation 2 determines the weighted average of fuel cell power at the end of the current drive cycle ("WFCP") taking into account previous drive cycles as well. The calculation uses a gain factor and average fuel cell power of current and previous cycles. In some embodiments, this may be referred to as a first order low-pass filter. In Equation 2, "Avg_FCE_Power$_k$" refers to the average fuel cell power of the current drive cycle as determined utilizing Equation 1, and "Avg_FCE_Power$_{weighted_{k-1}}$" refers to the weighted average of fuel cell power at the end of the previous cycle (which is determined utilizing Equation 2 as well, but for the previous cycle instead of the most recent "current" drive cycle).

Equation 2 is an equation of a low-pass filter in which "$\alpha$" is the filter gain factor. In some embodiments, the gain factor "$\alpha$" is a tuning parameter which is not dependent on the fuel cell 20 but instead is dependent on performance requirements of the fuel cell 20 and/or the vehicle 400. In some embodiments, a lower gain factor "$\alpha$" value may provide more importance to current instantaneous measurements of power of the fuel cell 20, while a higher gain factor "$\alpha$" value may provide less importance. In scenarios in which the method 500 adjusts the predicted range of the fuel cell 20 after each drive cycle, a lower gain factor "$\alpha$" value may be utilized. Conversely, in scenarios in which the method 500 adjusts the predicted range of the fuel cell 20 after a multiple drive cycles, a higher gain factor "$\alpha$" value may be utilized.

In some embodiments, calibration of the gain factor "$\alpha$" is a matter of engineering judgment, balancing the requirement for the weighted average of fuel cell power ("WFCP") calculation in Equation 2 against the requirement to attenuate variation in the average of fuel cell power ("Avg_FCE_Power$_k$") calculated in Equation 1. FIG. 7 shows a non-limiting example of how different filter constant values affect attenuation and time constants. Solely for illustrative, exemplary purposes, FIG. 7 shows a scenario in which the average of fuel cell power ("Avg_FCE_Power$_k$") to the filter changes from 0 to 1 (i.e., a step input), the time constant describes how many updates are required for the filter output to reach 0.63 (i.e., 63% of the step input). As can be seen in FIG. 7, filter constants close to 1.0 provide good attenuation at the expense of long response times, while smaller filter constants provide good response at the expense of lower noise/variation in data attenuation.

Once the weighted average of fuel cell power for the current drive cycle ("WFCP") is determined, the controller 310 is configured to carry out operational step 508 of the method 500, in particular determining the efficiency of the fuel cell 20 based on the weighted average of fuel cell power ("WFCP"), as shown in FIG. 6. This determination takes into account the age of the fuel cell 20 as well as fuel cell power ("WFCP"), and is calculated by Equation 3 below:

$$\text{Efficency}(\eta) = \qquad (3)$$
$$c_o + c_1 * WFCP + c_2 * WFCP^{\frac{3}{2}} + c_3 * H + c_4 * WFCP * H^{\frac{6}{5}}$$

In Equation 3, the value "WFCP" is the weighted average power output for the fuel cell 20 for the current drive cycles calculated in Equation 2, "H" is the age of the fuel cell 20 in k-hrs, and "$c_{0-4}$" refer to four coefficients that are predetermined calibration values for the particular fuel cell 20 being utilized. In some embodiments, the four coefficients "$c_{0-4}$" may be predetermined for the fuel cell 20 utilizing a linear regression method. As a non-limiting example, the four coefficients "$c_{0-4}$" may represent four characteristics of a line that are calculated either using any curve-fitting tool (i.e. linear regression method), any adaptive control technique (i.e. Kalman filtering), or other similar tools.

Figure 8:
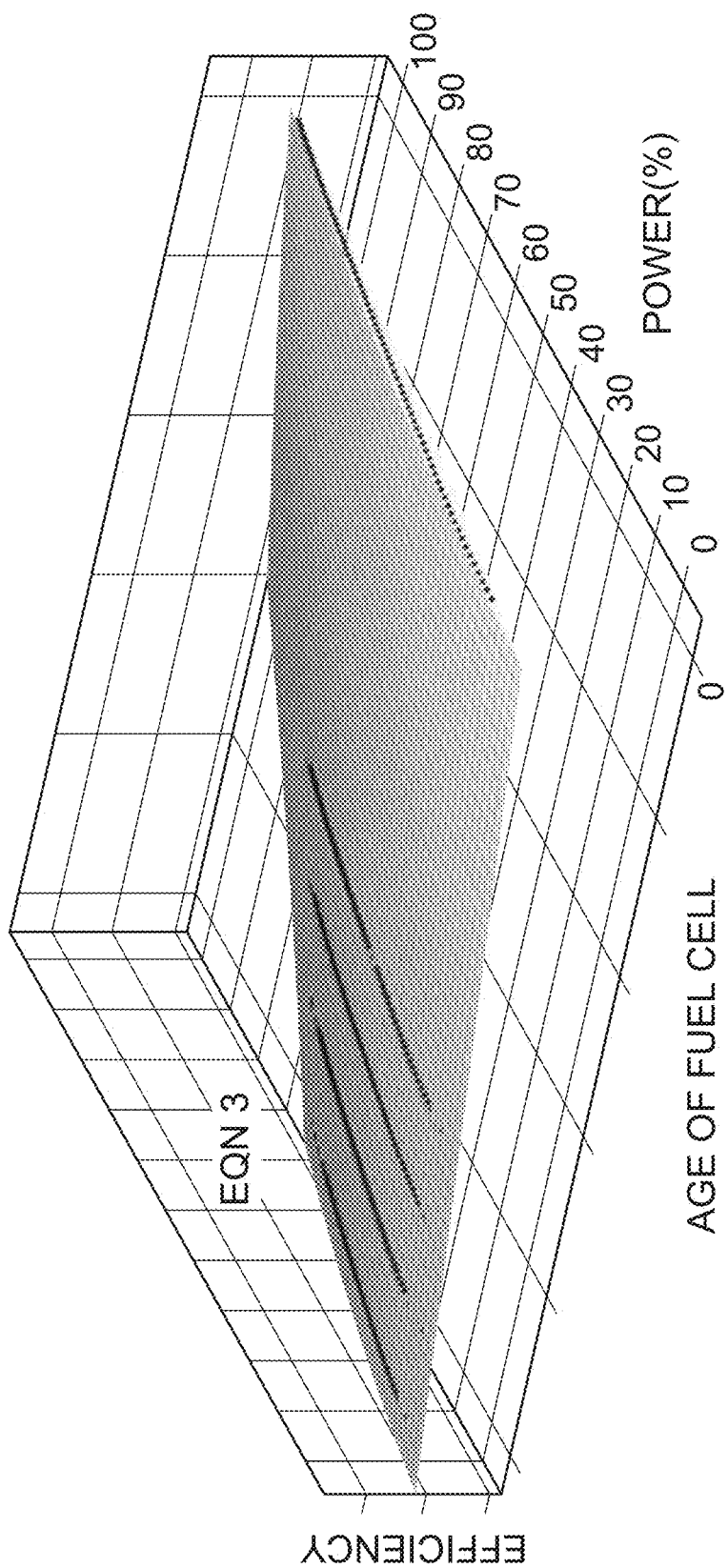
FIG. 8 is a graph showing efficiency versus age of the fuel cell and power output.

In some embodiments, the efficiency of the fuel cell 20 based on the weighted average of fuel cell power ("WFCP") may be determined via a lookup table or lookup graph as opposed to utilizing Equation 3. As a non-limiting example, FIG. 8 shows a three-dimensional plot of efficiency versus age of the fuel cell 20 and power output of the fuel cell 20. Thus, if the weighted average of fuel cell power ("WFCP") of the fuel cell 20 and the age ("H") of the fuel cell 20 are known, the efficiency of the fuel cell 20 based on the weighted average of fuel cell power ("WFCP") may be determined utilizing the graph of FIG. 8.

Moreover, as described above, the controller 310 may carry out the operational steps and calculations (i.e. operational steps 502, 504, 506, 508 and Equations 1-3) in order to determine the maximum efficiency points 130, 138, 146 of the fuel cell 20 of the methods 100, 200. Although these operational steps and calculations for determining the efficiency are based on instantaneous determinations of power output of the fuel cell 20, the same method steps and equations may be iteratively carried out in order to determine the maximum efficiency points 130, 138, 146 of the fuel cell 20.

In embodiments in which the vehicle 400 utilizes more than one fuel cell 20, the method 500 proceeds to operational step 510, in which the controller 310 determines whether the efficiency of additional fuel cells 20 must be determined, as shown in FIG. 6. If additional fuel cells 20 are being utilized by the vehicle 400, the method 500 returns to operational step 502. At this point, the controller 310 will determine the efficiency of the next fuel cell 20 by carrying out operational steps 502 through 508 for the next fuel cell 20.

For each fuel cell 20, the controller 310 is further configured to store the most recently determined efficiency of the fuel cell 20 at operational step 511, as shown in FIG. 6. In some embodiments, the data regarding the most recently determined efficiency of the fuel cell 20 may be stored in the memory 311 of the controller 310, as described above. The controller 310 may access the determined efficiency of the fuel cell 20 for subsequent calculations, as will be described with regard to operational step 512 below.

After the efficiency of all fuel cells 20 of the vehicle have been determined, the controller is configured to determine an average efficiency for all fuel cells 20 in the vehicle 400 in operational step 512 of the method 500, as shown in FIG.

6. This may be particularly useful in scenarios in which different fuel cells 20 of the vehicle 400 are operating at different power outputs (i.e. differing weighted average of fuel cell power values ("Avg_FCE_Power")) and/or different efficiencies. The average efficiency for all fuel cells 20 is calculated by Equation 4 below:

$$\text{Efficiency}_{avg} = \frac{\eta_1 * WFCP_1 + \eta_2 * WFCP_2 + \ldots + \eta_n * WFCP_n}{WFCP_1 + WFCP_2 + \ldots + WFCP_n} \quad (4)$$

In Equation 4, "$\eta_{1\ldots n}$" is the efficiency for each fuel cell 20 of the vehicle 400, as determined in Equation 3, and "$WFCP_{1\ldots n}$" is the weighted average of fuel cell power ("WFCP") for each fuel cell 20 of the vehicle 400, as determined in Equation 2.

Once the average efficiency is determined in operational step 512, the controller 310 is configured to begin the range estimation portion of the method 500, specifically via operational steps 514, 516, 518, as shown in FIG. 6. In operational step 514, the controller 310 is configured to determine fuel availability of the fuel cell 20 or fuel cells 20. The fuel availability is determined as usable charge stored in hydrogen in ampere-hours (Ahr). The fuel availability is calculated by Equation 5 below:

$$FCE_{current}(\text{Ahr}) = \frac{\text{Efficiency}_{avg} * (\text{clorofic\_value} * \text{Fuel mass})}{FCE \text{ output voltage} * 1000} \quad (5)$$

In Equation 5, the "$\text{Efficiency}_{avg}$" is the average efficiency for all fuel cells 20 as calculated in Equation 4. In embodiments that only include a single fuel cell 20, the "$\text{Efficiency}_{avg}$" is replaced by the "Efficiency (n)" for a single fuel cell 20, as calculated in Equation 3. In Equation 5, the "Fuel mass," expressed in kg, is the available fuel (hydrogen) available in a hydrogen tank supplying hydrogen to the fuel cells 20. The "FCE output voltage" is the output voltage of the fuel cell 20, and the "calorific_value" is the calorific value of the hydrogen fuel, which is the amount of heat energy produced by the full combustion of 1 kg of hydrogen fuel, expressed in KWhr/kg.

Once the fuel availability of the fuel cell 20 or fuel cells 20 is determined in operational step 514, the controller 310 is configured to determine the charge (Ahr) stored in the batteries 402 of the vehicle 400 associated with the fuel cell 20 or fuel cells 20 in operational step 516, as shown in FIG. 6. The charge (Ahr) stored in the batteries 402 is calculated by Equation 6 below:

$$\text{Battery}_{current}(\text{Ahr}) = \frac{\text{Batterty capacity} * SOC}{\text{Battery output voltage} * 1000 * 100} \quad (6)$$

In Equation 6, the "Battery capacity" is the total capacity of the battery 402 (KWhr), the "SOC" is the state of charge of the battery 402 as a percentage, and the "Battery output voltage" is the output voltage, expressed in V, of the fuel cell 20 (equal to the "FCE output voltage" of Equation 5).

Finally, once the charge, expressed in Ahr, stored in the batteries 402 of the vehicle 400 is determined in operational step 516, the controller 310 is configured to estimate the range of the fuel cell 20 or fuel cells 20 and/or the vehicle 400 in operational step 518, as shown in FIG. 6. The estimated range is calculated by Equation 7 below:

$$\text{Vehicle range (km)} = \frac{(\text{Battery}_{current} + FCE_{current}) * \text{Vehicle speed}_{avg}}{\text{Vehicle current}_{avg}} \quad (7)$$

In Equation 7, the "$\text{Battery}_{current}$" is the available current, expressed in Ahr, of the battery 402, as determined by Equation 6, the "$FCE_{current}$" is available current (Ahr) of the fuel cell 20 or fuel cells 20, as determined by Equation 5, the "$\text{Vehicle speed}_{avg}$" is the average speed (km/hr) of the vehicle 400, and the "$\text{Vehicle current}_{avg}$" is the average current, expressed in A, consumed by the vehicle 400.

The determination of the estimated range via the method 500 can provide useful information regarding the remaining life and potential usages of the fuel cell 20 or fuel cells 20 of the vehicle 400. In some embodiments, the estimated range may be utilized by the vehicle 400 in numerous scenarios. In one non-limiting example, the estimated range may be output to the display of an infotainment system 404 of the vehicle 400 so as to alert a driver of the remaining range of the vehicle 400 on its current charge and fuel supply. In other examples, the estimated range may be output to a central controller (similar to controller 310) or computer of the vehicle 400 to update an estimated remaining range of the vehicle 400 (i.e. a fuel or charge gauge) before a recharge and/or refuel would be required. In some examples, the estimated range may be output to a user interface 318 internal to the vehicle 400 or external to the vehicle 400.

In some embodiments, the estimated range may be output to the infotainment system 404, the central controller (similar to controller 310) or computer of the vehicle 400, the user interface 318, or any other external operator 319 and utilized for diagnosing the health of the fuel cell 20. If the range and efficiency is determined to be less than expected, this can indicate to the external operator 319 (i.e. a service engineer or maintenance personnel) and appropriate actions can be taken to remedy the performance of the fuel cell 20 and/or the vehicle 400.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There is a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The features illustrated or described in connection with one exemplary embodiment may be combined with any other feature or element of any other embodiment described herein. Such modifications and variations are intended to be included within the scope of the present disclosure. Further, a person skilled in the art will recognize that terms commonly known to those skilled in the art may be used interchangeably herein.

The above embodiments are described in sufficient detail to enable those skilled in the art to practice what is claimed and it is to be understood that logical, mechanical, and electrical changes may be made without departing from the spirit and scope of the claims. The detailed description is, therefore, not to be taken in a limiting sense.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Specified numerical ranges of units, measurements, and/or values comprise, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first," "second," "third" and the like, as used herein do not denote any order or importance, but rather are used to distinguish one element from another. The term "or" is meant to be inclusive and mean either or all of the listed items. In addition, the terms "connected" and "coupled" are not restricted to physical or mechanical connections or couplings, and can include electrical connections or couplings, whether direct or indirect.

Moreover, unless explicitly stated to the contrary, embodiments "comprising," "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps.

The phrase "consisting of" or "consists of" refers to a compound, composition, formulation, or method that excludes the presence of any additional elements, components, or method steps. The term "consisting of" also refers to a compound, composition, formulation, or method of the present disclosure that excludes the presence of any additional elements, components, or method steps.

The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

Approximating language, as used herein throughout the specification and claims, may be applied to modify any quantitative representation that could permissibly vary without resulting in a change in the basic function to which it is related. Accordingly, a value modified by a term or terms, such as "about," and "substantially" is not to be limited to the precise value specified. In some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be understood that the above description is intended to be illustrative, and not restrictive. For example, the above-described embodiments (and/or aspects thereof) may be used individually, together, or in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method of operating a fuel cell, comprising:
   determining, via a controller including a processor, a total age of the fuel cell, the total age defined by a total time period that the fuel cell has been operating over a lifespan of the fuel cell;
   determining, via the controller, a state-of-charge of a battery associated with the fuel cell;
   in response to the state-of-charge of the battery being greater than a predetermined charge threshold, operating the fuel cell at a maximum efficiency point, wherein the maximum efficiency point is predetermined via the controller and is based on predetermined efficiency data of the fuel cell, wherein the maximum efficiency point corresponds to a maximum efficiency power output of the fuel cell; and in response to the state-of-charge of the battery being less than or equal to the predetermined charge threshold, operating the fuel cell such that the battery operates in a charge-sustaining mode, wherein the maximum efficiency point is based on the determined total age of the fuel cell, and wherein the maximum efficiency power output of the fuel cell at the maximum efficiency point increases as the total age of the fuel cell increases so as to maximize a range of the fuel cell, wherein the total age of the fuel cell includes a first predetermined age threshold, wherein the fuel cell is operated at a first maximum efficiency point in response to the total age of the fuel cell being below the first predetermined age threshold, and wherein the fuel cell is operated at a second maximum efficiency point different than the first maximum efficiency point in response to the total age of the fuel cell being at or above the first predetermined age threshold.

2. The method of claim 1, wherein the first maximum efficiency point corresponds to a first power output of the fuel cell and the second maximum efficiency point corresponds to a second power output of the fuel cell greater than the first power output.

3. The method of claim 2, wherein the total age of the fuel cell further includes a second predetermined age threshold greater than the first predetermined age threshold, wherein the fuel cell is operated at the second maximum efficiency point in response to the total age of the fuel cell being at or above the first predetermined age threshold and below the second predetermined age threshold, and wherein the fuel cell is operated at a third maximum efficiency point different than the first and second maximum efficiency points in response to the total age of the fuel cell being at or above the second predetermined age threshold.

4. The method of claim 3, wherein the third maximum efficiency point corresponds to a third power output of the fuel cell greater than the first and second power outputs.

5. The method of claim 4, wherein a time period that is less than the first predetermined age threshold is a beginning-of-life age of the fuel cell, wherein a time period that is at or above the first predetermined age threshold and below the second predetermined age threshold is a mid-life age of the fuel cell, and wherein a time period that is at or above the second predetermined age threshold is an end-of-life time age of the fuel cell.

6. The method of claim 1, wherein, during the operation of the fuel cell in a first duty cycle environment, the operating of the fuel cell such that the battery operates in a charge-sustaining mode corresponds to a charge-sustaining power output of the fuel cell that is greater than the maximum efficiency power output of the fuel cell.

7. The method of claim 6, wherein, during the operation of the fuel cell in the first duty cycle environment, the state-of-charge of the battery is at or below the predetermined charge threshold for a first period of time and is above the predetermined charge threshold for a second period of time different than the first period of time, and wherein, during the first period of time, operating the fuel cell at the charge-sustaining power output and, during the second time period, operating the fuel cell at the maximum efficiency power output.

8. The method of claim 7, wherein the total age of the fuel cell includes a first predetermined age threshold, wherein, during the first period of time, the fuel cell is operated at a first charge-sustaining power output in response to the total age of the fuel cell being below the first predetermined age threshold, and wherein, during the first period of time, the fuel cell is operated at a second charge-sustaining power output less than the first charge-sustaining power output in response to the total age of the fuel cell being at or above the first predetermined age threshold.

9. The method of claim 8, wherein, during the second period of time, the fuel cell is operated at a first maximum efficiency power output in response to the total age of the fuel cell being below the first predetermined age threshold, and wherein, during the first period of time, the fuel cell is operated at a second maximum efficiency power output greater than the first maximum efficiency power output in response to the total age of the fuel cell being at or above the first predetermined age threshold.

10. The method of claim 1, wherein the predetermined charge threshold is about 50% to about 99% battery charge, and wherein the predetermined charge threshold is different for the first predetermined age threshold and the second predetermined age threshold.

11. A method of operating a fuel cell, comprising:
determining, via a controller including a processor, a total age of the fuel cell;
determining, via the controller, a state-of-charge of a battery associated with the fuel cell;
in response to the state-of-charge of the battery being greater than a predetermined charge threshold, operating the fuel cell at a maximum efficiency point, and
in response to the state-of-charge of the battery being less than or equal to the predetermined charge threshold, operating the fuel cell such that the battery operates in a charge-sustaining mode,
wherein the maximum efficiency point is based on the determined total age of the fuel cell and varies relative to the total age of the fuel cell so as to maximize a range of the fuel cell,
wherein the total age of the fuel cell includes a first predetermined age threshold, wherein the fuel cell is operated at a first maximum efficiency point in response to the total age of the fuel cell being below the first predetermined age threshold, and wherein the fuel cell is operated at a second maximum efficiency point different than the first maximum efficiency point in response to the total age of the fuel cell being at or above the first predetermined age threshold.

12. The method of claim 11, wherein the total age defined by a total time period that the fuel cell has been operating over a lifespan of the fuel cell, wherein the maximum efficiency point is predetermined via the controller and is based on predetermined efficiency data of the fuel cell, and wherein the maximum efficiency point corresponds to a maximum efficiency power output of the fuel cell.

13. The method of claim 12, wherein the maximum efficiency power output of the fuel cell at the maximum efficiency point increases as the total age of the fuel cell increases so as to maximize a range of the fuel cell.

14. The method of claim 11, wherein the first maximum efficiency point corresponds to a first power output of the fuel cell and the second maximum efficiency point corresponds to a second power output of the fuel cell greater than the first power output.

15. The method of claim 14, wherein the total age of the fuel cell further includes a second predetermined age threshold greater than the first predetermined age threshold, wherein the fuel cell is operated at the second maximum efficiency point in response to the total age of the fuel cell being at or above the first predetermined age threshold and below the second predetermined age threshold, and wherein the fuel cell is operated at a third maximum efficiency point different than the first and second maximum efficiency points in response to the total age of the fuel cell being at or above the second predetermined age threshold.

16. The method of claim 11, wherein a first maximum efficiency power output corresponding to the first maximum efficiency point is about 1% to about 50% of a peak power output of the fuel cell and a second maximum efficiency power output corresponding to the second maximum efficiency point is about 1% to about 40% of the peak power output of the fuel cell.

17. A system for operating a fuel cell, comprising:
a controller including a processor;
a fuel cell operably connected to the controller; and
a battery associated with the fuel cell and operably connected to the controller,
wherein the controller is configured to:
determine a total age of the fuel cell, the total age defined by a total time period that the fuel cell has been operating over a lifespan of the fuel cell;
determine a state-of-charge of a battery associated with the fuel cell;
in response to the state-of-charge of the battery being greater than a predetermined charge threshold, operate the fuel cell at a maximum efficiency point, wherein the maximum efficiency point is predetermined via the controller and is based on predetermined efficiency data of the fuel cell, wherein the maximum efficiency point corresponds to a maximum efficiency power output of the fuel cell; and
in response to the state-of-charge of the battery being less than or equal to the predetermined charge threshold, operate the fuel cell such that the battery operates in a charge-sustaining mode,
wherein the maximum efficiency point is based on the determined total age of the fuel cell, and wherein the maximum efficiency power output of the fuel cell at the maximum efficiency point increases as the total age of the fuel cell increases so as to maximize a range of the fuel cell,
wherein the total age of the fuel cell includes a first predetermined age threshold, wherein the fuel cell is operated at a first maximum efficiency point in response to the total age of the fuel cell being below the first predetermined age threshold, and wherein the fuel cell is operated at a second maximum efficiency point different than the first maximum efficiency point in response to the total age of the fuel cell being at or above the first predetermined age threshold.

18. The system of claim 17, wherein the first maximum efficiency point corresponds to a first power output of the fuel cell and the second maximum efficiency point corresponds to a second power output of the fuel cell greater than the first power output.

19. The system of claim 18, wherein the total age of the fuel cell further includes a second predetermined age threshold greater than the first predetermined age threshold, wherein the fuel cell is operated at the second maximum efficiency point in response to the total age of the fuel cell being at or above the first predetermined age threshold and below the second predetermined age threshold, and wherein the fuel cell is operated at a third maximum efficiency point different than the first and second maximum efficiency points in response to the total age of the fuel cell being at or above the second predetermined age threshold.

20. The system of claim 17, wherein a first maximum efficiency power output corresponding to the first maximum efficiency point is about 1% to about 50% of a peak power output of the fuel cell and a second maximum efficiency power output corresponding to the second maximum efficiency point is about 1% to about 40% of the peak power output of the fuel cell.

* * * * *